United States Patent
Töltsch et al.

(10) Patent No.: US 9,670,347 B2
(45) Date of Patent: Jun. 6, 2017

(54) PROPYLENE COMPOSITION WITH IMPROVED IMPACT RESISTANCE AT LOW TEMPERATURE

(71) Applicant: BOREALIS AG, Vienna (AT)

(72) Inventors: Wilfried Töltsch, Marchtrenk (AT); Luigi Resconi, Ferrara (IT); Kristin Reichelt, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/911,299

(22) PCT Filed: Jul. 14, 2014

(86) PCT No.: PCT/EP2014/065010
§ 371 (c)(1),
(2) Date: Feb. 10, 2016

(87) PCT Pub. No.: WO2015/022127
PCT Pub. Date: Feb. 19, 2015

(65) Prior Publication Data
US 2016/0280899 A1    Sep. 29, 2016

(30) Foreign Application Priority Data
Aug. 14, 2013   (EP) .................................... 13180389

(51) Int. Cl.
  *C08L 23/00*   (2006.01)
  *C08L 23/14*   (2006.01)
  *C08L 23/12*   (2006.01)

(52) U.S. Cl.
  CPC .............. *C08L 23/14* (2013.01); *C08L 23/12* (2013.01); *C08L 23/142* (2013.01); *C08L 2205/025* (2013.01); *C08L 2308/00* (2013.01)

(58) Field of Classification Search
  CPC ........ C08L 23/12; C08L 23/14; C08L 23/142; C08L 2205/025; C08L 2308/00
  See application file for complete search history.

(56) References Cited

U.S. PATENT DOCUMENTS

| | | | |
|---|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,691,043 A | 11/1997 | Keller et al. |
| 5,693,838 A | 12/1997 | Sangokoya et al. |
| 5,731,253 A | 3/1998 | Sangokoya |
| 5,731,451 A | 3/1998 | Smith et al. |
| 5,744,656 A | 4/1998 | Askham |

(Continued)

FOREIGN PATENT DOCUMENTS

| CN | 101563226 A | 11/1997 |
|---|---|---|
| CN | 1248198 A | 3/2000 |

(Continued)

OTHER PUBLICATIONS

U.S. Appl. No. 14/911,295, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/029,493, filed Apr. 14, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.

(Continued)

*Primary Examiner* — Nathan M Nutter
(74) *Attorney, Agent, or Firm* — Leydig, Voit & Mayer, Ltd.

(57) ABSTRACT

Polypropylene composition comprising comonomer units derived from ethylene in an amount of from 9.0 to 52.0 mol-% and comonomer units derived from a higher a-olefin in an amount of from 0.4 to 3.0 mol-%, wherein said polypropylene composition has an amount of xylene cold solubles of at least 30 wt.-%, wherein further the xylene cold soluble fraction has an ethylene content of from 20.0 to 80.0 mol-% and a higher a-olefin content from 0.1 to 1.5 mol-%.

19 Claims, 1 Drawing Sheet

(56) References Cited

U.S. PATENT DOCUMENTS

| | | |
|---|---|---|
| 6,316,562 B1 | 11/2001 | Munck et al. |
| 6,322,883 B1 | 11/2001 | Williams |
| 6,586,528 B1 | 7/2003 | Delaite et al. |
| 6,642,317 B1 | 11/2003 | Delaite et al. |
| 7,342,078 B2 | 3/2008 | Schottek et al. |
| 7,378,472 B2 | 5/2008 | Fell et al. |
| 7,569,651 B2 | 8/2009 | Schottek et al. |
| 8,709,561 B2 | 4/2014 | Bernreitner et al. |
| 8,779,062 B2 | 7/2014 | Paavilainen et al. |
| 8,889,792 B2 | 11/2014 | Paavilainen et al. |
| 9,243,137 B2 | 1/2016 | Reichelt et al. |
| 2003/0149199 A1 | 8/2003 | Schottek et al. |
| 2004/0033349 A1 | 2/2004 | Henderson |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0155080 A1 | 7/2006 | Fell et al. |
| 2006/0182987 A1 | 8/2006 | Yu et al. |
| 2006/0211801 A1 | 9/2006 | Miller et al. |
| 2007/0235896 A1 | 10/2007 | McLeod et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2010/0304062 A1 | 12/2010 | Daviknes et al. |
| 2011/0031645 A1 | 2/2011 | Kuettel et al. |
| 2012/0189830 A1 | 7/2012 | Niepelt et al. |
| 2012/0220727 A1* | 8/2012 | Klimke et al. .......... C08L 23/10 525/240 |
| 2013/0045862 A1 | 2/2013 | Valonen et al. |
| 2013/0167486 A1 | 7/2013 | Aarnio et al. |
| 2013/0178573 A1 | 7/2013 | Paavilainen et al. |
| 2013/0203931 A1 | 8/2013 | Paavilainen et al. |
| 2013/0236668 A1 | 9/2013 | Bernreitner et al. |
| 2014/0005324 A1 | 1/2014 | Reichelt et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |

FOREIGN PATENT DOCUMENTS

| | | |
|---|---|---|
| CN | 1398272 A | 2/2003 |
| CN | 1823106 A | 8/2006 |
| CN | 102869719 A | 1/2013 |
| CN | 103068574 A | 4/2013 |
| CN | 103347951 A | 10/2013 |
| EP | 0 045 977 B1 | 1/1987 |
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 487 203 A1 | 8/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | 2003-522259 A | 7/2003 |
| JP | 2007-526345 A | 9/2007 |
| JP | 2013-525531 A | 6/2013 |
| JP | 2013-525532 A | 6/2013 |
| WO | WO 87/07620 A1 | 12/1987 |
| WO | WO 92/12182 A1 | 7/1992 |
| WO | WO 92/13029 A1 | 8/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/10180 A1 | 5/1994 |
| WO | WO 94/14856 A1 | 7/1994 |
| WO | WO 95/12622 A1 | 5/1995 |
| WO | WO 95/32994 A1 | 12/1995 |
| WO | WO 97/10248 A1 | 3/1997 |
| WO | WO 97/14700 A1 | 4/1997 |
| WO | WO 97/28170 A1 | 8/1997 |
| WO | WO 97/36939 A1 | 10/1997 |
| WO | WO 98/12234 A1 | 3/1998 |
| WO | WO 98/16359 A1 | 4/1998 |
| WO | WO 98/38041 A1 | 9/1998 |
| WO | WO 98/40331 A1 | 9/1998 |
| WO | WO 98/46616 A1 | 10/1998 |

(56) References Cited

FOREIGN PATENT DOCUMENTS

| | | |
|---|---|---|
| WO | WO 98/47929 A1 | 10/1998 |
| WO | WO 98/49208 A1 | 11/1998 |
| WO | WO 98/56831 A1 | 12/1998 |
| WO | WO 98/58971 A1 | 12/1998 |
| WO | WO 98/58976 A1 | 12/1998 |
| WO | WO 98/58977 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/24478 A1 | 5/1999 |
| WO | WO 99/24479 A1 | 5/1999 |
| WO | WO 99/33842 A1 | 7/1999 |
| WO | WO 99/41290 A1 | 8/1999 |
| WO | WO 00/34341 A2 | 6/2000 |
| WO | WO 00/68315 A1 | 11/2000 |
| WO | WO 01/48034 A2 | 7/2001 |
| WO | WO 01/58970 A1 | 8/2001 |
| WO | WO 01/70395 A2 | 9/2001 |
| WO | WO 02/02576 A1 | 1/2002 |
| WO | WO 02/051912 A1 | 7/2002 |
| WO | WO 02/057342 A2 | 7/2002 |
| WO | WO 03/000754 A1 | 1/2003 |
| WO | WO 03/000755 A2 | 1/2003 |
| WO | WO 03/000756 A2 | 1/2003 |
| WO | WO 03/000757 A1 | 1/2003 |
| WO | WO 03/051934 A2 | 6/2003 |
| WO | WO 03/054035 A1 | 7/2003 |
| WO | WO 03/066698 A1 | 8/2003 |
| WO | WO 03/082879 A1 | 10/2003 |
| WO | WO 04/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2009/092691 A1 | 7/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/052263 A1 | 5/2010 |
| WO | WO 2010/053644 A1 | 5/2010 |
| WO | WO 2010/082943 A1 | 7/2010 |
| WO | WO 2010/115878 A1 | 10/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/092615 A1 | 6/2013 |
| WO | WO 2013/092620 A1 | 6/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |
| WO | WO 2015/177094 A1 | 11/2015 |

OTHER PUBLICATIONS

U.S. Appl. No. 15/113,922, filed Jul. 25, 2016.
U.S. Appl. No. 15/115,929, filed Aug. 2, 2016.
"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," *J. Appl. Polymer Sci* 68:1493-1501 (1998).
Atwood, "Chapter 6: Anionic and Cationic Organoaluminum Compounds," *Coord. Chem. Alum.*, VCH, New York, NY, pp. 197-232 (1993).
Britovsek el al., "The Search for New-Generation Olefin Polymerization Catalysts: Life beyond Metallocenes," *Angew. Chem. Int. Ed.*, vol. 38(4), pp. 428-447 (1999).
Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Castignolles et al., "Detection and quantification of branching in polyacrylates by size-exclusion chromatography (SEC) and melt-state $^{13}$C NMR spectroscopy," *Polymer*, 50(11):2373-2383, (2009).
Cheng, "$^{13}$C NMR Analysis of Ethylene-Propylene Rubbers," *Macromolecules* 17:1950-1955 (1984).
Cimmino et al., "Thermal and mechanical properties of isotactic random propylene-butene-1 copolymers," *Polymer* 19:1222-1223 (1978).
Crispino et al., "Influence of Composition on the Melt Crystallization of Isotactic Random Propylene/1-Butene Copolymers," *Makromol. Chem.* 181:1747-1755 (1980).
Filip et al., "Heteronuclear decoupling under fast MAS by a rotor-synchronized Hahn-echo pulse train,"*J. Magnet. Reson.* 176:239-243 (2005).
Fujiyama et al., "Effect of Molecular Parameters on the Shrinkage of Injection-Molded Polypropylene," *J. Appl. Polym. Sci.* 22:1225-1241 (1978).
Gahleitner et al., "Nucleation of Polypropylene Homo- and Copolymers," *International Polymer Processing* 26(1):2-20 (2011).
Galli et al., "Technology: driving force behind innovation and growth of polyolefins," *Prog. Polym. Sci.* 26:1287-1336 (2001).

(56) References Cited

OTHER PUBLICATIONS

Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).

Griffin et al., "Low-load rotor-synchronised Hahn-echo pulse train (RS-HEPT) [1] H decoupling in solid-state NMR: factors affecting MAS spin-echo dephasing times," *Magn. Reson. Chem.* 45:S198-S208 (2007).

Holbrey et al., "Liquid clathrate formation in ionic liquid-aromatic mixtures," *Chem. Comm.*, 2003, pp. 476-477.

Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," *Macromolecules* 15:1150-1152 (1982).

Klimke et al., "Optimisation and Application of Polyolefin Branch Quantification by Melt-State $^{13}$C NMR Spectroscopy," *Macromol. Chem. Phys.* 207(4):382-395 (2006).

McAuley et al., "On-line Inference of Polymer Properties in an Industrial Polyethylene Reactor," *AIChE Journal*, vol. 37, No. 6, pp. 825-835 (1991).

Myhre et al., "Oriented PE films—Expanding Opportunities with Borstar® PE," Maack Speciality Films, pp. 1-10 (2001).

Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).

*Plastics Additives Handbook*, 5th edition, Hans Zweifel, Editor, Hanser Publishers, Munich, pp. 871-873 (2001).

*Plastics Additives Handbook*, 5th edition, Hans Zweifel, Editor, Hanser Publishers, Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

Propylene Handbook, 2$^{nd}$Edition Chapter 7.2.2 "Oriented Films," pp. 405-415, Nello Pasquini, Editor, Hanser (2005).

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," *JACS* 120(10):2308-2321 (1998).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}$ C NMR," *Polymer Testing* 28(5):475-479 (2009).

Spaleck et al., "The Influence of Aromatic Substituents on the Polymerization Behavior of Bridged Zirconocene Catalysts," *Organometallics* 13:954-963 (1994).

Spear et al., "Liquid Clathrates," *Encyclopedia of Supramolecular Chemistry*, J.L. Atwood and J.W. Steed (Eds.); Marcel Dekker: New York, pp. 804-808 (2004).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

European Patent Office, International Search Report in International Application No. PCT/EP2014/065010 (Aug. 1, 2014).

European Patent Office, Written Opinion in International Application No. PCT/EP2014/065010 (Aug. 1, 2014).

European Patent Office, International Preliminary Report on Patentability in International Application No. PCT/EP2014/065010 (Feb. 25, 2016).

Koch et al., "Evaluation of scratch resistance in multiphase PP blends," *Polymer Testing* 26: 927-936 (2007).

"Polyethylene Lumicene® mPE M5510 EP," Total Refining & Chemicals, Total Ecosolutions, Belgium, Aug. 2013 (2 pgs.).

State Intellectual Property Office of the People's Republic of China, First Notification of Office Action in Chinese Patent Application No. 201480045175.2 (Nov. 2, 2016).

Korean Intellectual Propety Office, Notice of Grounds for Rejection in Korean Patent Application No. 10-2016-7005781 (Feb. 15, 2017).

Japanese Patent Office, Notice of Reasons for Rejection in Japanese Patent Application No. 2016-533853 (Mar. 14, 2017).

\* cited by examiner

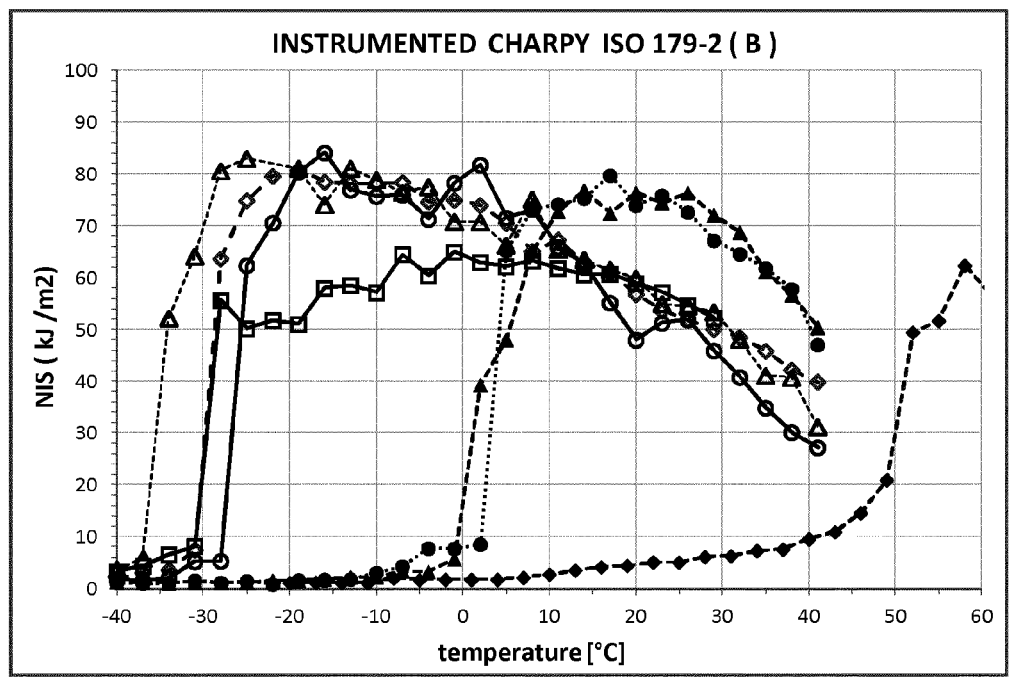
Figure 1: Impact behavior of the the examples
| CE1 | dashed line, full diamonds |
| CE2 | dashed line, full triangles |
| IE1 | solid line, empty circles |
| IE2 | solid line, empty squares |
| CE3 | dotted line, full circles |
| IE3 | dashed line, empty diamonds |
| IE4 | dotted line, empty triangles |

PROPYLENE COMPOSITION WITH IMPROVED IMPACT RESISTANCE AT LOW TEMPERATURE

CROSS-REFERENCE TO RELATED APPLICATIONS

This patent application is the U.S. national phase of International Application No. PCT/EP2014/065010, filed on Jul. 14, 2014, which claims the benefit of European Patent Application No. 13180389.2, filed Aug. 14, 2013, the disclosures of which are incorporated herein by reference in their entireties for all purposes.

The present invention is directed to a new polypropylene composition, to its use as a molded article as well as to its manufacture.

Producing propylene polymer compositions with a proper stiffness-toughness-softness balance is a long-standing problem. There is still a need to design materials with increased softness and toughness, while keeping the melting point high enough so as to ensure thermal stability, e.g. to make materials sterilizable by steam treatment.

It frequently turns out that improvement of one of these properties is achieved on the expense of the other properties.

There is still a need to design materials having an improved balance between increased softness and toughness, especially increased toughness at low temperatures, and sufficiently high thermal stability.

According to a first aspect of the present invention, the object is solved by providing a polypropylene composition comprising comonomer units derived from ethylene in an amount of from 9.0 to 52.0 mol-% and comonomer units derived from at least one $C_{5-12}$ α-olefin, preferably comonomer units derived from 1-hexene, in an amount of from 0.4 to 3.5 mol-%, wherein said polypropylene composition
(a) has an amount of xylene cold solubles (XCS) of at least 30 wt.-%, and
(b) fulfills in-equation (I)

$$IV(XCS)-IV(tot) \leq 0.30 \quad (I)$$

wherein
IV(XCS) is the intrinsic viscosity (IV) of the xylene cold soluble (XCS) fraction of the polypropylene composition
IV(tot) is the intrinsic viscosity (IV) of the polypropylene composition.

Preferably, the xylene cold soluble (XCS) fraction of the polypropylene composition according to the first aspect has an amount of
(a) ethylene-derived comonomer units of from 20.0 to 80.0 mol-%; and/or
(b) $C_{5-12}$ α-olefin-derived comonomer units, preferably 1-hexene derived comonomer units, of from 0.1 to 1.5 mol-%.

According to a second aspect of the present invention, the object is solved by providing a polypropylene composition comprising comonomer units derived from ethylene in an amount of from 9.0 to 52.0 mol-% and comonomer units derived from at least one $C_{5-12}$ α-olefin, preferably comonomer units derived from 1-hexene, in an amount of from 0.4 to 3.5 mol-%, wherein said polypropylene composition has an amount of xylene solubles (XS) of at least 30 wt.-%,
wherein further the xylene solubles (XS) of the polypropylene composition has an amount of
(a) ethylene-derived comonomer units of from 20.0 to 80.0 mol-%; and/or
(b) $C_{5-12}$ α-olefin-derived comonomer units, preferably 1-hexene derived comonomer units, of from 0.1 to 1.5 mol-%.

Preferably, the polypropylene composition according to the second aspect fulfills in-equation (I)

$$IV(XCS)-IV(tot) \leq 0.3 \quad (I)$$

wherein
IV(XCS) is the intrinsic viscosity (IV) of the xylene cold soluble (XCS) fraction of the polypropylene composition;
IV(tot) is the intrinsic viscosity (IV) of the polypropylene composition.

In the following the two aspects of the present invention will be described together in more detail.

One essential aspect of the present invention is that the polypropylene composition must comprise at least three different monomers, preferably three different monomers, two of which are derived from propylene and ethylene, respectively, whereas the other monomers are derived from at least one $C_{5-12}$ α-olefin. More preferably the propylene composition consists of monomer units derived from propylene, ethylene and at least one $C_{5-12}$ α-olefin, still more preferably the propylene composition consists of monomer units derived from propylene, ethylene and 1-hexene and/or 1-octene, yet more preferably the propylene composition consists of monomer units derived from propylene, ethylene and 1-hexene.

In a preferred embodiment, the polypropylene composition does not contain any butene-derived (such as 1-butene-derived) monomer units.

In the term "comonomer units" indicates that the units are derived from ethylene and/or $C_{5-12}$ α-olefin, but not from propylene.

The polypropylene composition according to this invention comprises comonomer units derived from ethylene in an amount of from 9.0 to 52.0 mol-%, preferably from 10.0 to 50.0 mol-%, more preferably from 11.0 to 45.0 mol-%, still more preferably from 12.0 to 40.0 mol-%, like from 13.0 to 25.0 mol-%.

As indicated above, the polypropylene composition comprises in addition to propylene and ethylene comonomer units derived from at least one $C_{5-12}$ α-olefin, preferably derived from 1-hexene and/or 1-octene. The amount of comonomer units derived from at least one $C_{5-12}$ α-olefin, preferably derived from 1-hexene and/or 1-octene, is from 0.4 to 3.5 mol-%, preferably from 0.4 to 3.0 mol-%, more preferably from 0.4 to 2.0 mol-%, still more preferably from 0.4 to 1.6 mol-%, yet more preferably from 0.4 to 1.3 mol-%.

The total amount of comonomer units in the polypropylene composition, i.e. units derived from ethylene and at least one $C_{5-12}$ α-olefin, is preferably from 9.4 to 55.5 mol-%, more preferably from 10.4 to 53.0 mol-%, more preferably from 11.4 to 47.0 mol-%, still more preferably from 12.4 to 41.6 mol-%, like 13.4 to 26.3 mol-%.

It is further preferred that the polypropylene composition has an intrinsic viscosity (IV) in the range of 1.0 to 3.0 dl/g, like in the range of 1.2 to 3.0 dl/g, more preferably in the range of 1.4 to 2.8 dl/g, like in the range of 1.5 to 2.5 dl/g, still more preferably in the range of 1.5 to 2.2 dl/g.

Preferably the polypropylene composition has a melt flow rate MFR2 (230° C.) in the range of 0.5 to 100 g/10 min, more preferably in the range of 1.0 to 50 g/10 min, like in the range of 1.0 to 30 g/10 min.

Preferably the polypropylene composition has a melting temperature of at least 130° C., more preferably in the range of 130 to 155° C., still more preferably in the range of 135 to 150° C., like in the range of 138 to 148° C.

Further it is preferred that the polypropylene composition has a crystallization temperature of at least 98° C., more preferably in the range of 100 to 118° C., still more preferably in the range of 102 to 115° C. These values are especially applicable in case the polypropylene composition is not nucleated, e.g. not α-nucleated.

The polypropylene composition according to this invention is preferably heterophasic (see discussion below). Accordingly it is preferred that the polypropylene composition contains elastomeric (co)polymers forming inclusions as a second phase for improving mechanical properties. A polymer containing elastomeric (co)polymers as insertions of a second phase is called heterophasic and is preferably part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the polypropylene composition according to this invention has a glass transition temperature below −25, preferably below −30° C., more preferably in the range of −50 to −25° C., still more preferably in the range of −45 to −30° C.

The amount of the xylene cold soluble (XCS) fraction of the polypropylene composition is rather high, i.e. at least 30 wt.-%, more preferably is at least 35 wt.-%, still more preferably in the range of 35 to 65 wt.-%, yet more preferably in the range of 35 to 55 wt.-%.

The polypropylene composition is preferably further featured by the intrinsic viscosity and/or the comonomer content of the xylene cold soluble (XCS) fraction. Accordingly it is preferred that the intrinsic viscosity (IV) of the xylene cold soluble (XCS) fraction is in the range of 1.5 to 4.0 dl/g, more preferably in the range of 1.5 to 3.0 dl/g, still more preferably in the range of 1.5 to 2.5 dl/g, yet more preferably in the range of 1.6 to 2.3 dl/g, like in the range of 1.6 to 2.1 dl/g.

It is especially preferred that the difference between the intrinsic viscosity (IV) of the xylene cold soluble (XCS) fraction of the polypropylene composition and the intrinsic viscosity (IV) of the total polypropylene composition is rather low. Accordingly it is preferred that the polypropylene composition fulfills in-equation (I), more preferably fulfills in-equation (Ia), yet more preferably fulfills in-equation (Ib), $$IV(XCS)-IV(tot) \leq 0.30 \qquad (I);$$

$$-2.00 \leq IV(XCS)-IV(tot) \leq 0.30 \qquad (Ia);$$

$$-1.00 \leq IV(XCS)-IV(tot) \leq 0.28 \qquad (Ib);$$

wherein
IV(XCS) is the intrinsic viscosity (IV) of the xylene cold soluble (XCS) fraction of the polypropylene composition
IV(tot) is the intrinsic viscosity (IV) of the polypropylene composition.

Additionally it is preferred that the xylene cold soluble (XCS) fraction comprises, preferably consists of, units derived from propylene, ethylene and at least one $C_{5-12}$ α-olefin. Still more preferably the xylene cold soluble (XCS) fraction comprises, preferably consists of, units derived from propylene, ethylene and one $C_{5-12}$ α-olefin. Yet more preferably the xylene cold soluble (XCS) fraction comprises, preferably consists of, units derived from propylene, ethylene and 1-hexene and/or 1-octene. In one especially preferred embodiment the xylene cold soluble (XCS) fraction comprises, preferably consists of, units derived from propylene, ethylene and 1-hexene.

The xylene cold soluble (XCS) fraction of the polypropylene composition preferably comprises comonomer units derived from ethylene in an amount of from 20.0 to 80.0 mol-%, more preferably from 20.0 to 70.0 mol-%, yet more preferably from 20.0 to 60.0 mol-%, even more preferably from 21.0 to 55.0 mol.-%, like from 22.0 to 40.0 mol.-%.

In one embodiment the amount of 20 wt-% of ethylene-derived comonomer units in the xylene cold soluble (XCS) fraction of the polypropylene composition is excluded.

Preferably the amount of comonomer units derived from at least one $C_{5-12}$ α-olefin, preferably derived from 1-hexene and/or 1-octene, of the xylene cold soluble (XCS) fraction of the polypropylene composition is from 0.1 to 1.5 mol-%, more preferably from 0.1 to 1.4 mol-%, still more preferably from 0.1 to 1.2 mol-%, still more preferably from 0.2 to 1.1 mol-%.

The total amount of comonomer units in the xylene cold soluble (XCS) fraction of the polypropylene composition, i.e. units derived from ethylene and at least one $C_{5-12}$ α-olefin, is preferably from 20.1 to 81.5 mol-%, more preferably 20.1 to 71.4 mol-%, yet more preferably from 20.1 to 61.2 mol-%, still more preferably from 21.2 to 56.1 mol-%, like from 22.2 to 41.1 mol.-%.

In one preferred embodiment the polypropylene composition fulfills in-equation (II), more preferably in-equation (IIa), yet more preferably in-equation (IIb)

$$57.0 < \frac{XCS}{CX(XCS)} < 300 \qquad (II)$$

$$59.0 < \frac{XCS}{CX(XCS)} < 200 \qquad (IIa)$$

$$61.0 < \frac{XCS}{CX(XCS)} < 150 \qquad (IIb)$$

wherein
CX(XCS) is the amount in mol-% of $C_{5-12}$ α-olefin-derived comonomer units in the xylene cold soluble (XCS) fraction of the polypropylene composition,
XCS is the amount in wt.-% of xylene cold soluble (XCS) fraction of the polypropylene composition.

In order to provide sufficient softness, it can be preferred that the polypropylene composition has a tensile modulus of less 500 MPa, more preferably less than 450 MPa, even more preferably in the range of 150 to 450 MPa, like in the range of 200 to 420 MPa.

In a preferred embodiment the propylene copolymer of the present invention is a blend, preferably a reactor blend, of a propylene copolymer (C) and an elastomeric copolymer (E), e.g. a terpolymer (T). Preferably the propylene copolymer (C) acts as a matrix in which the elastomeric copolymer (E) is dispersed. In other words the propylene copolymer is a heterophasic propylene copolymer (HECO) comprising the propylene copolymer (C) as the matrix (M) in which the elastomeric copolymer (E), e.g. the terpolymer (T), is dispersed.

The weight ratio between the propylene copolymer (C) and the elastomeric copolymer (E), e.g. the terpolymer (T), [(C)((E)] is 75:25 to 40:60, more preferably 70:30 to 45:55, still more preferably 65:35 to 50:50.

Preferably the polypropylene composition, e.g. the heterophasic propylene copolymer (HECO), comprises as main components the propylene copolymer (C) and the elastomeric copolymer (E). Other components present in the polypropylene composition, e.g. in the heterophasic propylene copolymer (HECO), can be for instance additives or low amounts of other polymers. "Other polymers" are for example polyethylene (as a side-product of the polymerization process of the polypropylene composition, e.g. of the heterophasic propylene copolymer (HECO), or polymer carrier for the additives. Typically the amount of polymers other than the propylene copolymer (C) and the elastomeric copolymer (E) does not exceed 15 wt.-%, more preferably does not exceed 10 wt.-%, like does not exceed 5 wt.-%, based on the total weight of the polypropylene composition, e.g. of the heterophasic propylene copolymer (HECO). Further the total amount of additives (excluding the so called other polymers), like antioxidants, nucleating agents, slip agents and antistatic agents, are preferably present in an amount of at most 7 wt.-%, more preferably at most 5 wt.-%, like in the range of 0.5 to 5 wt.-%, based on the total weight of the polypropylene composition, e.g. of the heterophasic propylene copolymer (HECO). Accordingly in one embodiment the amount of the propylene copolymer (C) and the elastomeric copolymer (E) together is at least 70 wt.-%, more preferably at least 80 wt.-%, still more preferably at least 85 wt.-%, yet more preferably at least 90 wt.-%, like at least 95 wt.-%.

The elastomeric copolymer (E) preferably is a terpolymer (T) or higher copolymer of units derived from propylene, ethylene and at least one $C_{5-12}$ α-olefin. In one preferred embodiment the elastomeric copolymer (E) is a terpolymer (T) of units derived from propylene, ethylene and one $C_{5-12}$ α-olefin. Yet more preferably elastomeric copolymer (E) is a terpolymer (T) of units derived from propylene, ethylene and 1-hexene and/or 1-octene. In one especially preferred embodiment the elastomeric copolymer (E) is a terpolymer (T) of units derived from propylene, ethylene and 1-hexene.

Preferably the elastomeric copolymer (E), e.g. the terpolymer (T), comprises comonomer units derived from ethylene in an amount of from 20.0 to 80.0 mol-%, more preferably from 22.0 to 70.0 mol-%, yet more preferably from 22.0 to 60.0 mol-%, still more preferably from 24.0 to 55.0 mol-%, like from 25.0 to 52.0 mol-%.

Preferably the amount of comonomer units derived from at least one $C_{5-12}$ α-olefin, preferably derived from 1-hexene and/or 1-octene, of the elastomeric copolymer (E), e.g. of the terpolymer (T), is from 0.05 to 2.0 mol-%, more preferably from 0.1 to 2.0 mol-%, still more preferably from 0.1 to 1.5 mol-%, still more preferably from 0.1 to 1.0 mol-%.

The total amount of comonomer units, i.e. units derived from ethylene and at least one $C_{5-12}$ α-olefin, of the elastomeric copolymer (E), e.g. of the terpolymer (T), is preferably from 20.05 to 82.0 mol-%, more preferably 20.1 to 72.0 mol-%, yet more preferably from 22.1 to 61.5 mol-%, still more preferably from 24.1 to 56.0 mol-%, like from 25.1 to 53.0 mol-%.

As mentioned above the matrix (M) of the polypropylene composition in which the elastomeric copolymer (E), e.g. the terpolymer (T), is dispersed is a propylene copolymer (C) of units derived from propylene and at least one $C_{5-12}$ α-olefin. In other words the matrix (M) does not encompass units derived from ethylene. In one preferred embodiment the propylene copolymer (C) acting as the matrix (M) is a propylene copolymer of units derived from propylene and one $C_{5-12}$ α-olefin. Yet more preferably the propylene copolymer (C) consists of units derived from propylene, 1-hexene and/or 1-octene. In one especially preferred embodiment the propylene copolymer (C) consists of units derived from propylene and 1-hexene.

Preferably the amount of comonomer units derived from at least one $C_{5-12}$ α-olefin, preferably derived from 1-hexene and/or 1-octene, of the propylene copolymer (C) is from 0.8 to 8.0 mol-%, more preferably from 0.9 to 7.0 mol-%, still more preferably from 0.9 to 5.0 mol-%, like from 0.9 to 3.0 mol-%.

The amount of the xylene cold soluble (XCS) fraction of the propylene copolymer (C) depends to great extent on the amount of comonomer units derived from at least one $C_{5-12}$ α-olefin. Accordingly it is preferred that the propylene copolymer (C) has a xylene cold soluble (XCS) content of not more than 38 wt.-%, more preferably of not more than 30 wt.-%, even more preferably in the range of 1 to 38 wt.-%, still more preferably in the range of 2 to 33 wt.-%, yet more preferably in the range of 3 to 25 wt.-%.

Preferably the propylene copolymer (C) has an intrinsic viscosity (IV) is in the range of 0.8 to 3.0 dl/g, more preferably in the range of 1.0 to 2.5 dl/g, still more preferably in the range of 1.2 to 2.0 dl/g.

In a preferred embodiment the propylene copolymer (C) has a melt flow rate $MFR_2$ (230° C.) in the range of 1 to 200 g/10 min, more preferably in the range of 5 to 100 g/10 min, still more preferably in the range of 10 to 60 g/10 min.

In one preferred embodiment the propylene copolymer (C) comprises at least two polypropylene fractions, at least one of said polypropylene fractions is a propylene copolymer fraction (CF) of units derived from propylene and at least one $C_{5-12}$ α-olefin. Still more preferably the propylene copolymer (C) consists of two polypropylene fractions, at least one of said two polypropylene fractions is a propylene copolymer fraction (CF) of units derived from propylene and at least one $C_{5-12}$ α-olefin.

Accordingly in one embodiment the propylene copolymer (C) comprises at least two propylene copolymer fractions (CF1) and (CF2), more preferably consists of two propylene copolymer fractions (CF1) and (CF2), both of said propylene copolymer fractions are propylene copolymer fractions of units derived from propylene and at least one $C_{5-12}$ α-olefin. In one preferred embodiment the propylene copolymer (C) comprises at least two propylene copolymer fractions (CF1) and (CF2), more preferably consists of two propylene copolymer fractions (CF1) and (CF2), both of said propylene copolymer fractions are propylene copolymer fractions of units derived from propylene and one $C_{5-12}$ α-olefin, i.e. 1-hexene or 1-octene.

In case the propylene copolymer (C) comprises two, preferably consists of two, propylene copolymer fractions (CF1) and (CF2) both fractions differ in the amount of comonomer units derived from at least one $C_{5-12}$ α-olefin, e.g. the propylene copolymer fraction (CF1) is the comonomer lean fraction and the propylene copolymer fraction (CF2) is the comonomer rich fraction. Preferably the amount of comonomer units derived from at least one $C_{5-12}$ α-olefin, preferably derived from 1-hexene and/or 1-octene, of the propylene copolymer fraction (CF1) is from 0.05 to 2.0 mol-%, more preferably from 0.1 to 1.5 mol-%, still more preferably from 0.2 to 1.0 mol-%. On the other hand the amount of comonomer units derived from at least one $C_{5-12}$ α-olefin, preferably derived from 1-hexene and/or 1-octene, of the propylene copolymer fraction (CF2) is from 1.0 to 12.0 mol-%, more preferably from 2.0 to 10.0 mol-%, still more preferably from 3.0 to 8.0 mol-%, like 3.0 to 6.0 mol-%, preferably with the proviso that the amount of comonomers in the propylene copolymer fraction (CF2) is higher than in the propylene copolymer fraction (CF1). Preferably in both propylene copolymer fractions (CF1) and (CF2) the same comonomers derived from $C_{5-12}$ α-olefin are present, e.g. 1-hexene or 1-octene.

The weight fraction between the propylene copolymer fractions (CF1) and (CF2) [(CF1)/(CF2)] is preferably between 75/25 to 30/70, more preferably between 70/30 to 40/60, like 70/30 to 45/55.

Accordingly in one embodiment the polypropylene composition, e.g. the heterophasic propylene copolymer (HECO), comprises
(a) 20 to 50 wt.-%, more preferably 23 to 45 wt.-%, still more preferably 25 to 40 wt.-%, of the propylene copolymer fraction (CF1)
(b) 15 to 40 wt.-%, more preferably 16 to 35 wt.-%, still more preferably 16 to 32 wt.-%, of the propylene copolymer fraction (CF2)
(c) 25 to 60 wt.-%, more preferably 30 to 55 wt.-%, still more preferably 35 to 50 wt.-%, of the elastomeric copolymer (E), e.g. of the terpolymer (T),
based on the total weight of the propylene copolymer fraction (CF1), the propylene copolymer fraction (CF2) and the elastomeric copolymer (E), e.g. the terpolymer (T), together.

In another preferred embodiment the propylene copolymer (C) comprises at least two polypropylene fractions, more preferably consists of two polypropylene fractions, one of said polypropylene fractions is a propylene homopolymer fraction (HF1) and the other is a propylene copolymer fraction (CF1') of units derived from propylene and at least one $C_{5-12}$ α-olefin. In a still more preferred embodiment the propylene copolymer (C) comprises at least two polypropylene fractions, more preferably consists of two polypropylene fractions, one of said two polypropylene fractions is a propylene homopolymer fraction (HF1) and the other is a propylene copolymer fraction (CF1') of units derived from propylene and one $C_{5-12}$ α-olefin, i.e. 1-hexene or 1-octene.

The expression homopolymer used in the instant invention relates to a polypropylene that consists of more than 99.90 mol-%, more preferably of more than 99.95 mol-%, of propylene units. In a preferred embodiment only propylene units in the propylene homopolymer are detectable. Accordingly the propylene homopolymer fraction (HF1) complies with the definition in this paragraph.

On the other hand the amount of comonomer units derived from at least one $C_{5-12}$ α-olefin, preferably derived from 1-hexene and/or 1-octene, of the propylene copolymer fraction (CF1') is from 1.0 to 15.0 mol-%, more preferably from 2.0 to 12.0 mol-%, still more preferably from 2.5 to 10.0 mol-%, like 2.8 to 8.0 mol-%.

The weight fraction between the polypropylene fractions (HF1) and (CF1') [(HF1)/(CF1')] is preferably between 75/25 to 30/70, more preferably between 70/30 to 40/60, like 70/30 to 45/55.

Accordingly in one embodiment the polypropylene composition, e.g. the heterophasic propylene copolymer (HECO), comprises
(a) 20 to 50 wt.-%, more preferably 23 to 45 wt.-%, still more preferably 25 to 40 wt.-%, of the propylene homopolymer fraction (HF1)
(b) 15 to 40 wt.-%, more preferably 16 to 35 wt.-%, still more preferably 16 to 32 wt.-%, of the propylene copolymer fraction (CF1')
(c) 25 to 60 wt.-%, more preferably 30 to 55 wt.-%, still more preferably 35 to 50 wt.-%, of the elastomeric copolymer (E), e.g. of the terpolymer (T),
based on the total weight of the propylene homopolymer fraction (HF1), the propylene copolymer fraction (CF1') and the elastomeric copolymer (E), e.g. the terpolymer (T), together.

According to a further aspect, the present invention provides a molded article comprising the polypropylene composition as defined above.

The molded article can be prepared by any known molding process, such as injection molding (i.e. injection-molded article) or extrusion molding (i.e. extrusion-molded article).

Preferably the polypropylene composition is preferably obtained by a process as defined in more detail below.

The polypropylene composition, e.g. the heterophasic propylene copolymer (HECO), according to this invention is preferably produced in the presence of the catalyst or catalyst composition as defined in detail below. Preferably the polymerization takes place in a sequential polymerization system comprising at least two polymerization reactors (R1) and (R2). However it is especially preferred that the polypropylene composition, e.g. the heterophasic propylene copolymer (HECO), is produced in a sequential polymerization process comprising at least three one polymerization reactors (R1), (R2) and (R3). Further the process may also comprise a pre-polymerization reactor (PR). The term "pre-polymerization" as well as the term "pre-polymerization reactor (PR)" indicates that this is not the main polymerization in which the polypropylene composition, e.g. the heterophasic propylene copolymer (HECO), is produced. In turn in the "at least two polymerization reactors (R1) and (R2)" takes the main polymerization place, i.e. where polypropylene composition, e.g. the heterophasic propylene copolymer (HECO), is produced. That means the expression "polymerization reactor" does not include the pre-polymerization reactor (PR). Thus, in case the process "consists of" two polymerization reactors (R1) and (R2) or three polymerization reactors (R1); (R2) and (R3), this definition does by no means exclude that the overall process comprises the pre-polymerization step in a pre-polymerization reactor. The term "consist of" is only a closing formulation in view of the main polymerization reactors.

Typically the weight ratio of the polypropylene (Pre-PP), e.g. of the propylene copolymer (Pre-PPC), produced in pre-polymerization reactor (PR) and the catalyst is below 500 g Pre-PP/g cat, more preferably in the range of 1 to 300 g pre-PP/g cat, still more preferably in the range of 5 to 200 g Pre-PP/g cat, yet more preferably in the range of 10 to 100 g Pre-PP/g cat.

In the pre-polymerization step the same monomers can be polymerized like in the main polymerization, or just propylene. In one embodiment, just propylene is polymerized in the pre-polymerization reactor.

The pre-polymerization reaction is preferably conducted at an operating temperature of more than 0 to 60° C., preferably from 5 to 50° C., and more preferably from 15 to 40° C., like from 20 to 30° C.

The pressure in the pre-polymerization reactor is not critical but must be sufficiently high to maintain the reaction mixture in liquid phase. Thus, the pressure may be from 5 to 100 bar, for example 10 to 70 bar.

The average residence time (τ) is defined as the ratio of the reaction volume ($V_R$) to the volumetric outflow rate from the reactor ($Q_o$) (i.e. $V_R/Q_o$), i.e. i=$V_R/Q_o$ [tau=$V_R/Q_o$]. In case of a loop reactor the reaction volume ($V_R$) equals to the reactor volume.

The average residence time (τ) in the pre-polymerization reactor (PR) is preferably in the range of 3 to 50 min, still more preferably in the range of more than 8 to 45 min, like in the range of 10 to 30 min.

In a preferred embodiment, the pre-polymerization is conducted as bulk slurry polymerization in liquid propylene and optional comonomer, i.e. the liquid phase mainly comprises propylene and optional comonomer, with optionally inert components dissolved therein. Furthermore, according to the present invention, a hydrogen ($H_2$) feed can be employed during pre-polymerization as mentioned above.

The pre-polymerization is conducted in the presence of the catalyst or catalyst composition as defined below. Accordingly the complex and the optional cocatalyst (Co) are introduced to the pre-polymerization step. However, this shall not exclude the option that at a later stage for instance further cocatalyst is added in the polymerization process, for instance in the first reactor (R1). In a preferred embodiment the complex and the cocatalyst are only added in the pre-polymerization reactor (PR).

It is possible to add other components also to the pre-polymerization stage. Thus, antistatic additive may be used to prevent the particles from adhering to each other or to the walls of the reactor.

The precise control of the pre-polymerization conditions and reaction parameters is within the skill of the art.

Subsequent to the pre-polymerization—if used—the mixture of the complex or complex composition and the polypropylene (Pre-PP), like the propylene copolymer (Pre-PPC), produced in the pre-polymerization reactor (PR) is transferred to the first reactor (R1). Typically the total amount of the polypropylene (Pre-PP), like the propylene copolymer (Pre-PPC), in the final copolymer (PPC) is rather low and typically not more than 5.0 wt.-%, more preferably not more than 4.0 wt.-%, still more preferably in the range of 0.1 to 4.0 wt.-%, like in the range 0.2 of to 3.0 wt.-%.

The polymerization reactor (R1) can be a gas phase reactor (GPR) or slurry reactor (SR). Preferably the polymerization reactor (R1) is a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The polymer produced in the polymerization reactor (R1), like in the loop reactor (LR1), is directly fed into the polymerization reactor (R2), e.g. into a loop reactor (LR2) or gas phase reactor (GPR-1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first fraction of the polypropylene composition, e.g. of the heterophasic propylene copolymer (HECO), is led directly to the next stage gas phase reactor.

Alternatively, the first fraction of polypropylene composition, e.g. of the heterophasic propylene copolymer (HECO), i.e. the polymer of the polymerization reactor (R1), may be also directed into a flash step or through a further concentration step before fed into the polymerization reactor (R2), e.g. into the loop reactor (LR2) or the gas phase reactor (GPR-1). Accordingly, this "indirect feed" refers to a process wherein the content of the first polymerization reactor (R1), of the loop reactor (LR), i.e. the polymer slurry, is fed into the second polymerization reactor (R2), e.g. into the loop reactor (LR2) or the first gas phase reactor (GPR-1), via a reaction medium separation unit and the reaction medium as a gas from the separation unit.

A gas phase reactor (GPR) according to this invention is preferably a fluidized bed reactor, a fast fluidized bed reactor or a settled bed reactor or any combination thereof.

More specifically, the polymerization reactor (R2), the polymerization reactor (R3) and any subsequent polymerization reactor, if present, are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor (R1) is a slurry reactor (SR), like loop reactor (LR), whereas the second polymerization reactor (R2), the third polymerization reactor (R3) and any optional subsequent polymerization reactor are gas phase reactors (GPR). Prior to the slurry reactor (SR) a pre-polymerization reactor can placed according to the present invention.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The operating temperature in the polymerization reactor (R1), i.e. in the loop reactor (LR), is in the range of 50 to 130° C., more preferably in the range of 60 to 100° C., still more preferably in the range of 65 to 90° C., yet more preferably in the range of 70 to 90° C., like in the range of 70 to 80° C.

On the other hand the operating temperature of the polymerization reactors (R2 and R3), i.e. of the first and second gas phase reactors (GPR1 and GPR2), is in the range of 60 to 100° C., more preferably in the range of 70 to 95° C., still more preferably in the range of 75 to 90° C., yet more preferably in the range of 78 to 85° C. In one embodiment the operating temperature of the polymerization reactor (R3), i.e. of the second gas phase reactor (GPR2), and any optional subsequent gas phase reactors (GPR) is in the range of 60 to 85° C., more preferably in the range of 65 to 80° C.

Typically the pressure in the polymerization reactor (R1), preferably in the loop reactor (LR), is in the range of from 28 to 80 bar, preferably 32 to 60 bar, whereas the pressure in the second polymerization reactor (R2), i.e. in the first gas phase reactor (GPR-1), and in the third polymerization reactor (R3), i.e. in the second gas phase reactor (GPR-2), and in any subsequent polymerization reactor, if present, is in the range of from 5 to 50 bar, preferably 15 to 35 bar.

Preferably hydrogen is added in each polymerization reactor in order to control the molecular weight, i.e. the melt flow rate $MFR_2$.

The residence time can vary in the reactor zones.

For instance the average residence time (τ) in the bulk reactor, e.g. in the loop reactor (LR), is in the range 0.2 to 4 hours, e.g. 0.3 to 1.5 hours and the average residence time (τ) in gas phase reactor(s) will generally be 0.2 to 6.0 hours, like 0.5 to 4.0 hours.

Accordingly the polymerization of the polypropylene composition, e.g. of the heterophasic propylene copolymer (HECO), takes place in a sequential polymerization process comprising, preferably consisting of, the polymerization reactors (R1) and (R2) and optional (R3), in which the polymerization reactor (R1) is preferably a slurry reactor (SR1), e.g. a loop reactor (LR1), whereas the polymerization reactors (R2) and (R3) are gas phase reactors (GPR1) and (GPR2). Preferably upstream to the polymerization reactor (R1) a pre-polymerization reactor (PR) is arranged in which the pre-polymerization takes place.

In case the polypropylene composition, e.g. the heterophasic propylene copolymer (HECO), is produced in two polymerization reactors (R1) and (R2), the matrix (M) of the polypropylene composition, i.e. the propylene copolymer (C), is produced in the polymerization reactor (R1), like the slurry reactor (SR), e.g. the loop reactor (LR), whereas the elastomeric copolymer (E), e.g. the terpolymer (T), is produced in the polymerization reactor (R2), e.g. in the gas phase reactor (GPR-1). In such a case in the polymerization reactor (R1), like in the slurry reactor (SR), e.g. in the loop reactor (LR), propylene and at least one $C_{5-12}$ α-olefin, like 1-hexene or 1-octene, are polymerized in the presence of a catalyst or a catalyst composition as defined in detail below obtaining thereby the propylene copolymer (C). The obtained propylene copolymer (C) is subsequently transferred in the polymerization reactor (R2) in which in the presence of the propylene copolymer (C) the elastomeric copolymer (E), e.g. the terpolymer (T), is produced. In the polymerization reactor (R2) propylene, ethylene and optionally at least one $C_{5-12}$ α-olefin, like 1-hexene or 1-octene, is fed. However in a preferred embodiment only propylene and ethylene is fed, whereas the excess of the at least one $C_{5-12}$ α-olefin, like the excess of the 1-hexene or of the 1-octene, from the polymerization reactor (R1) is consumed. Preferably in both polymerization reactors (R1) and (R2) the same catalyst or catalyst composition is used, even more preferred the catalyst or catalyst composition of the polymerization reactor (R1) is transferred to the polymerization reactor (R2).

In case the polypropylene composition, e.g. the heterophasic propylene copolymer (HECO), is produced in three or four polymerization reactors (R1), (R2), (R3) and optional (R4), the matrix (M) of the polypropylene composition, i.e. the propylene copolymer (C), is produced in the polymerization reactor (R1), like in the slurry reactor (SR1), e.g. in the loop reactor (LR1), and the polymerization reactor (R2), like in the slurry reactor (SR2), e.g. the loop reactor in (LR2), or in the gas phase reactor (GPR-1), whereas the elastomeric copolymer (E), e.g. the terpolymer (T), is produced in the polymerization reactor (R3), e.g. in the gas phase reactor (GPR-2) and in the optional polymerization reactor (R4), e.g. in the optional gas phase reactor (GPR-3). In such a case in the polymerization reactor (R1), like in the slurry reactor (SR1), e.g. in the loop reactor (LR1), propylene and optionally at least one $C_{5-12}$ α-olefin, like 1-hexene or 1-octene, is/are polymerized in the presence of a catalyst or catalyst composition as defined in detail below obtaining thereby the propylene copolymer fraction (CF1) or the propylene homopolymer fraction (HF1), the latter preferred. In case of the production of the propylene homopolymer fraction (HF1) only propylene as monomer is fed into the polymerization reactor (R1). The thus obtained propylene copolymer fraction (CF1) or propylene homopolymer fraction (HF1) is subsequently transferred in the second polymerization reactor (R2) in which in the presence of the propylene copolymer fraction (CF1) or the propylene homopolymer fraction (HF1) a propylene copolymer fraction is produced. Accordingly in the second polymerization reactor (R2) propylene and at least one $C_{5-12}$ α-olefin, like 1-hexene or 1-octene, is fed obtaining either the propylene copolymer fraction (CF1') (in case in the polymerization reactor (R1) the propylene homopolymer fraction (HF1) was produced) or the propylene copolymer fraction (CF2) (in case in the polymerization reactor (R1) the propylene copolymer fraction (CF1) was produced). Concerning the definition of (HF1), (CF1), (CF1') and (CF2) reference is made to the information provided above. The mixture of the propylene homopolymer fraction (HF1) and the propylene copolymer fraction (CF1') or the mixture of the propylene copolymer fraction (CF1) and the propylene copolymer fraction (CF2) is the matrix (M), i.e. the propylene copolymer (C). Subsequently the elastomeric copolymer (E), e.g. the terpolymer (T), is produced in the polymerization reactor (R3). In the polymerization reactor (R3) propylene, ethylene and optionally at least one $C_{5-12}$ α-olefin, like 1-hexene or 1-octene, is fed. However in a preferred embodiment only propylene and ethylene is fed, whereas the excess of the at least one $C_{5-12}$ α-olefin, like the excess of the 1-hexene or of the 1-octene, from the polymerization reactor (R2) is consumed. Preferably in all reactors (R1), (R2) and (R3) the same catalyst or catalyst composition is used, even more preferred the catalyst or catalyst composition of the polymerization reactor (R1) is transferred to the polymerization reactor (R2) and from the polymerization reactor (R2) to the polymerization reactor (R3).

Accordingly in all polymerization reactors the same catalyst or catalyst composition as defined below is preferably present.

The catalyst used in the process must contain a substituted bisindenyl metallocene complex, in which the two indenyl ligands are connected by a chemical link (the "bridge")

Additionally the catalyst must comprise a cocatalyst.

Preferably the molar-ratio of cocatalyst (Co) to the metal (M) of the complex, like Zr, [Co/M] is below 500, more preferably in the range of more than 100 to below 500, still more preferably in the range of 150 to 450, yet more preferably in the range of 200 to 450.

In one embodiment the catalyst is used in the form of a catalyst composition, said composition comprises a polymer in which the catalyst is distributed. The term "distributed" in this regard shall preferably indicate that the catalyst system is not concentrated at one place within the polymer but (evenly) dispersed within the polymer. This has the advantage that—contrary to commercially available supported catalyst systems—an overheating at the beginning of the polymerization process due to "hot spots" areas caused by concentration of catalytic species at one place is diminished which in turn supports a start of the polymerization in a controlled way under mild conditions. The even distribution of catalyst in polymer is mainly achieved due to the manufacture of the catalyst composition as described in WO 2010/052260. One remarkable feature of the process is that the catalyst composition is obtained by heterogeneous catalysis, i.e. the catalyst used in the preparation of the catalyst composition is in solid form when polymerizing at least one olefin monomer, preferably at least one α-olefin monomer, like propylene, to the in which then the catalyst is dispersed. Thus the catalyst if dispersed in a polymer is obtainable, preferably obtained, by heterogeneous catalysis using the solid catalyst as defined in the instant invention.

A further characteristic of the catalyst composition according to the present invention is that the catalyst within the catalyst composition is protected against dissolution phenomena in a slurry reactor, i.e. in low molar mass hydrocarbons, like propane, iso-butane, pentane, hexane or propylene. On the other hand the protection of the catalyst should be not too massive otherwise the catalytic activity of the active species might be deteriorated. In the present invention the conflicting interests one the one hand of high catalytic activity of the catalyst and on the other hand of the solid stability of the catalyst in the polymerization medium of the slurry reactor is achieved by protecting the catalyst by a polymer wherein the polymer is present in rather low amounts within the catalyst composition. Rather low weight ratio of polymer to catalyst [weight polymer/weight catalyst], also named polymerization degree, leads to a satisfactory protection against dissolution by keeping the catalyst on high levels. Accordingly it is appreciated that the polymerization degree [weight polymer/weight catalyst] is below 25.0, more preferably below 15.0, yet more preferably below 10.0, still yet more preferably below 5.0. On the other hand to achieve a reasonable protection against dissolution the polymerization degree [weight polymer/weight catalyst] shall preferably exceed a value of 0.5, more preferably of 0.7, yet more preferably of 1.0. Preferred ranges of the polymerization degree [weight polymer/weight catalyst] shall be 0.7 to 10.0, more preferably 1.0 to 8.0, yet more preferably 1.0 to 6.0, still more preferably 1.0 to 5.0, still yet more preferably of 2.0 to 5.0.

The polymer can be any type of polymer as long as it prevents the dissolution of the catalyst in the polymerization medium of a slurry reactor, i.e. low molar mass hydrocarbons, like propane, iso-butane, pentane, hexane or propylene, and is catalytically inert. Accordingly the polymer is preferably based on olefin monomers, like α-olefin monomers, each having 2 to 20 carbon atoms. The olefin, like α-olefin, can be linear or branched, cyclic or acyclic, aromatic or aliphatic. Preferred examples are ethylene, propylene, 1-butene, 3-methyl-1-butene, 3-methyl-1-pentene, 4-methyl-1-pentene and vinylcyclohexane.

It is in particular preferred that the polymer corresponds to the polymer which shall be produced with the inventive solid catalyst composition. Accordingly it is preferred that the polymer is preferably a polymer selected from the group consisting of ethylene homopolymer, ethylene copolymer, propylene homopolymer and propylene copolymer. In one embodiment the polymer is a propylene homopolymer.

Concerning the preparation of the catalyst composition as defined above reference is made to WO 2010/052260.

The single site metallocene complex, especially the complexes defined by the formulas specified in the present invention, used for manufacture of the propylene copolymer are those described by formula (I)

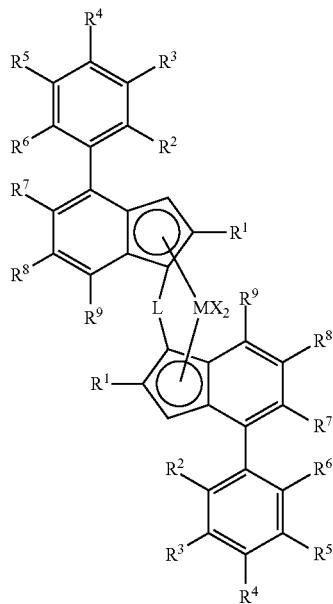

wherein

M is zirconium (Zr) or hafnium (Hf), preferably zirconium (Zr);

X are ligands with a σ-bond to the metal "M", preferably those as defined above for formula (I), preferably chlorine (Cl) or methyl ($CH_3$), the former especially preferred, The term "σ-ligand" is understood in the whole description in a known manner, i.e. a group bound to the metal via a sigma bond. Thus the anionic ligands "X" can independently be halogen or be selected from the group consisting of R', OR', $SiR'_3$, $OSiR'_3$, $OSO_2CF_3$, OCOR', SR', $NR'_2$ or $PR'_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16, in preferred embodiments the anionic ligands "X" are identical and either halogen, like Cl, or methyl or benzyl, the most preferred monovalent anionic ligand is halogen, in particular chlorine (Cl);

$R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl;

$R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), and/or $R^7$ and $R^8$ are optionally part of a $C_4$ to $C_{20}$ carbon ring system together with the indenyl carbons to which they are attached, preferably a $C_5$ or $C_6$ ring, optionally one carbon atom of such ring can be replaced by a silicon, sulfur or oxygen atom, where each carbon or silicon atom of such ring has its valence saturated by H or $R^{10}$ groups, and N, when present, is either part of an aromatic cycle or carries an $R^{10}$ group, where $R^{10}$ is as described above, with the proviso that at least two of $R^7$ and $R^8$ are different from H;

$R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$, preferably $R^9$ are equal to or different from each other and are H or $CH_3$, wherein $R^{10}$ is defined as before, L is a bivalent group bridging the two indenyl ligands, preferably being a $C_2R^{11}_4$ unit or a $SiR^{11}_2$ or $GeR^{11}_2$, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

In one preferred embodiment, the transition metal compound is rac-dimethylsilanediyl bis(2-methyl-4-phenyl-1,5,6,7-tetrahydro-s-indacen-1-yl)zirconium dichloride.

In another preferred embodiment, the transition metal compound is rac-dimethylsilanediyl bis(2-methyl-4-phenyl-5-methoxy-6-tert-butylindenyl)zirconium dichloride.

In a preferred embodiment, the metallocene complexes are asymmetrical. That means that the two indenyl ligands forming the metallocene complex are different, that is, each indenyl ligand bears a set of substituents that are either chemically different, or located in different positions with respect to the other indenyl ligand. More precisely, they are chiral, racemic bridged bisindenyl metallocene complexes. Whilst the complexes of the invention may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the Figure below.

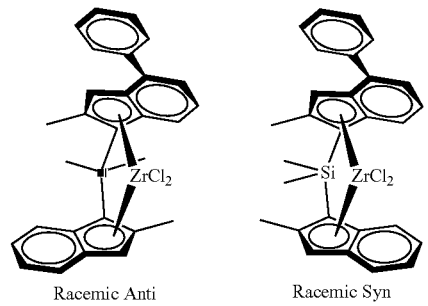

Racemic Anti          Racemic Syn

Formula (I) is intended to include and the anti configuration. It is required in addition, that the group $R^5$ is not hydrogen where the 5-position in the other ligand carries a hydrogen.

In fact, the metallocene complexes of use in the invention are $C_1$-symmetric but they maintain a pseudo-$C_2$-symmetry since they maintain $C_2$-symmetry in close proximity of the metal center, although not at the ligand periphery. As will be seen, the use of two different indenyl ligands as described in this invention allows for a much finer structural variation, hence a more precise tuning of the catalyst performance, compared to the typical $C_2$-symmetric catalysts. By nature of their chemistry, both anti and syn enantiomer pairs are formed during the synthesis of the complexes. However, by using the ligands of this invention, separation of the preferred anti isomers from the syn isomers is straightforward.

It is preferred if the metallocene complexes of the invention are employed as the rac anti isomer. Ideally therefore at least 95% mol, such as at least 98% mol, especially at least 99% mol of the metallocene catalyst is in the racemic anti isomeric form.

In the complex of use in the invention:

M is preferably Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, $C_{1-20}$ alkyl, $C_{2-20}$ alkenyl, $C_{2-20}$ alkynyl, $C_{6-20}$ aryl, $C_{7-20}$ alkylaryl or $C_{7-20}$ arylalkyl radical; optionally containing heteroatoms belonging to groups 14-16. R is preferably a $C_{1-6}$ alkyl, phenyl or benzyl group.

Most preferably each X is independently a hydrogen atom, a halogen atom, $C_{1-6}$ alkoxy group or an R group, e.g. preferably a $C_{1-6}$ alkyl, phenyl or benzyl group. Most preferably X is chlorine or a methyl radical. Preferably both X groups are the same.

L is preferably an alkylene linker or a bridge comprising a heteroatom, such as silicon or germanium, e.g. —$SiR^8_2$—, wherein each $R^8$ is independently $C_{1-20}$ alkyl, $C_{3-10}$ cycloakyl, $C_{6-20}$ aryl or tri($C_{1-20}$ alkyl)silyl, such as trimethylsilyl. More preferably $R^8$ is $C_{1-6}$ alkyl, especially methyl or $C_{3-7}$ cycloalkyl, such as cyclohexyl. Most preferably, L is a dimethylsilyl or a methylcyclohexylsilyl bridge (i.e. Me-Si-cyclohexyl). It may also be an ethylene bridge.

$R^2$ and $R^{2'}$ can be different but they are preferably the same. $R^2$ and $R^{2'}$ are preferably a $C_{1-10}$ hydrocarbyl group such as $C_{1-6}$ hydrocarbyl group. More preferably it is a linear or branched $C_{1-10}$ alkyl group. More preferably it is a linear or branched $C_{1-6}$ alkyl group, especially linear $C_{1-6}$ alkyl group such as methyl or ethyl.

The $R^2$ and $R^{2'}$ groups can be interrupted by one or more heteroatoms, such as 1 or 2 heteroatoms, e.g. one heteroatom, selected from groups 14 to 16 of the periodic table. Such a heteroatom is preferably O, N or S, especially O. More preferably however the $R^2$ and $R^{2'}$ groups are free from heteroatoms. Most especially $R^2$ and $R^{2'}$ are methyl, especially both methyl.

The two Ar groups Ar and Ar' can be the same or different. It is preferred however if the Ar groups are different. The Ar' group may be unsubstituted. The Ar' is preferably a phenyl based group optionally substituted by groups $R^1$, especially an unsubstituted phenyl group.

The Ar group is preferably a $C_{6-20}$ aryl group such as a phenyl group or naphthyl group. Whilst the Ar group can be a heteroaryl group, such as carbazolyl, it is preferable that Ar is not a heteroaryl group. The Ar group can be unsubstituted or substituted by one or more groups $R^1$, more preferably by one or two $R^1$ groups, especially in position 4 of the aryl ring bound to the indenyl ligand or in the 3,5-positions.

In one embodiment both Ar and Ar' are unsubstituted. In another embodiment Ar' is unsubstituted and Ar is substituted by one or two groups $R^1$.

$R^1$ is preferably a $C_{1-20}$ hydrocarbyl group, such as a $C_{1-20}$ alkyl group. $R^1$ groups can be the same or different, preferably the same. More preferably, $R^1$ is a $C_{2-10}$ alkyl group such as $C_{3-8}$ alkyl group. Highly preferred groups are tert butyl or isopropyl groups. It is preferred if the group $R^1$ is bulky, i.e. is branched. Branching might be alpha or beta to the ring. Branched $C_{3-8}$ alkyl groups are also favoured therefore.

In a further embodiment, two $R^1$ groups on adjacent carbon atoms taken together can form a fused 5 or 6 membered non aromatic ring with the Ar group, said ring being itself optionally substituted with one or more groups $R^4$. Such a ring might form a tetrahydroindenyl group with the Ar ring or a tetrahydronaphthyl group.

If an $R^4$ group is present, there is preferably only 1 such group. It is preferably a $C_{1-10}$ alkyl group.

It is preferred if there is one or two $R^1$ groups present on the Ar group. Where there is one $R^1$ group present, the group is preferably para to the indenyl ring (4-position). Where two $R^1$ groups are present these are preferably at the 3 and 5 positions.

$R^{5'}$ is preferably a $C_{1-20}$ hydrocarbyl group containing one or more heteroatoms from groups 14-16 and optionally substituted by one or more halo atoms or $R^{5'}$ is a $C_{1-10}$ alkyl group, such as methyl but most preferably it is a group $Z'R^{3'}$.

$R^6$ and $R^{6'}$ may be the same or different. In one preferred embodiment one of $R^6$ and $R^{6'}$ is hydrogen, especially $R^6$. It is preferred if $R^6$ and $R^{6'}$ are not both hydrogen. If not hydrogen, it is preferred if each $R^6$ and $R^{6'}$ is preferably a $C_{1-20}$ hydrocarbyl group, such as a $C_{1-20}$ alkyl group or $C_{6-10}$ aryl group. More preferably, $R^6$ and $R^{6'}$ are a $C_{2-10}$ alkyl group such as $C_{3-8}$ alkyl group. Highly preferred groups are tert-butyl groups. It is preferred if $R^6$ and $R^{6'}$ are bulky, i.e. are branched. Branching might be alpha or beta to the ring. Branched $C_{3-8}$ alkyl groups are also favoured therefore.

The $R^7$ and $R^{7'}$ groups can be the same or different. Each $R^7$ and $R^{7'}$ group is preferably hydrogen, a $C_{1-6}$ alkyl group or is a group $ZR^3$. It is preferred if $R^{7'}$ is hydrogen. It is preferred if $R^7$ is hydrogen, $C_{1-6}$ alkyl or $ZR^3$. The combination of both $R^7$ and $R^{7'}$ being hydrogen is most preferred. It is also preferred if $ZR^3$ represents $OC_{1-6}$ alkyl, such as methoxy. It is also preferred is $R^7$ represents $C_{1-6}$ alkyl such as methyl.

Z and Z' are O or S, preferably O.

$R^3$ is preferably a $C_{1-10}$ hydrocarbyl group, especially a $C_{1-10}$ alkyl group, or aryl group optionally substituted by one or more halo groups. Most especially $R^3$ is a $C_{1-6}$ alkyl group, such as a linear $C_{1-6}$ alkyl group, e.g. methyl or ethyl.

$R^{3'}$ is preferably a $C_{1-10}$ hydrocarbyl group, especially a $C_{1-10}$ alkyl group, or aryl group optionally substituted by one or more halo groups. Most especially $R^{3'}$ is a $C_{1-6}$ alkyl group, such as a linear $C_{1-6}$ alkyl group, e.g. methyl or ethyl or it is a phenyl based radical optionally substituted with one or more halo groups such as Ph or $C_6F_5$.

Thus, preferred complexes of the invention are of formula (II) or (II')

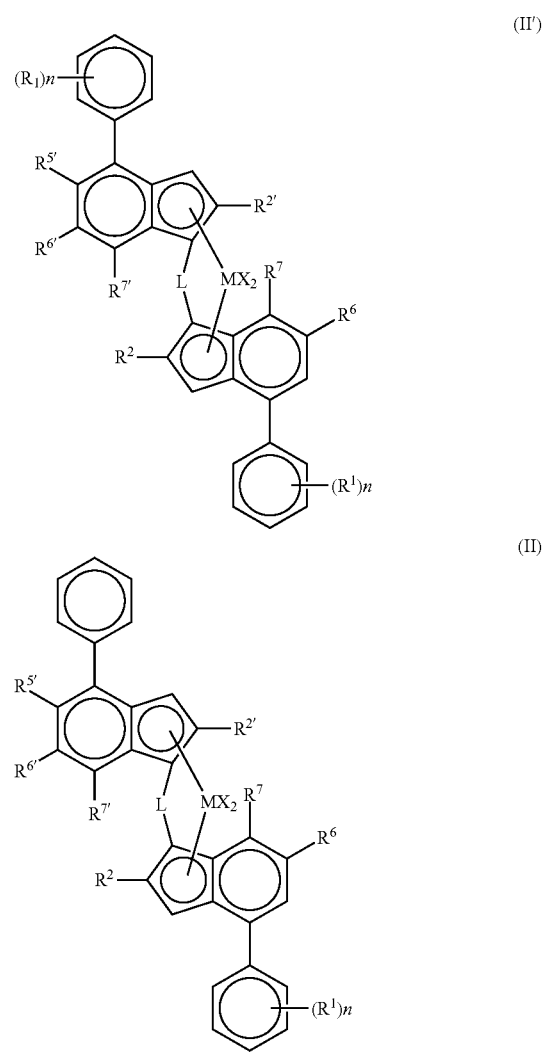

wherein

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from $-R'_2C-$, $-R'_2C-CR'_2-$, $-R'_2Si-$, $-R'_2Si-SiR'_2-$, $-R'_2Ge-$, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

R[6] is hydrogen or a $C_{1-10}$ alkyl group;
R[6'] is a $C_{1-10}$ alkyl group or $C_{6-10}$ aryl group;
R[7] is hydrogen, a $C_{1-6}$ alkyl group or $ZR^3$ group;
R[7'] is hydrogen or a $C_{1-10}$ alkyl group;
Z and Z' are independently O or S;
R[3'] is a $C_{1-10}$ alkyl group, or a $C_{6-10}$ aryl group optionally substituted by one or more halo groups;
R[3] is a $C_{1-10}$-alkyl group;
Each n is independently 0 to 4, e.g. 0, 1 or 2;
and each R[1] is independently a $C_{1-20}$ hydrocarbyl group, e.g. $C_{1-10}$ alkyl group.

Further preferred complexes of the invention are those of formula (III) or (III'):

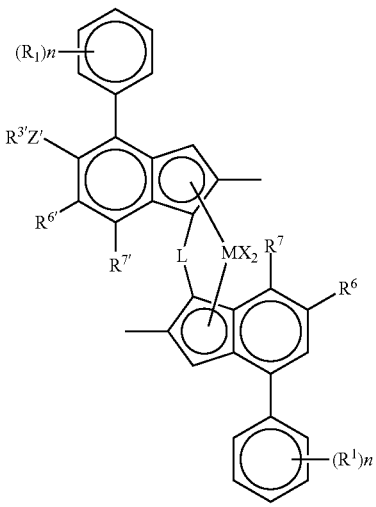

(III')

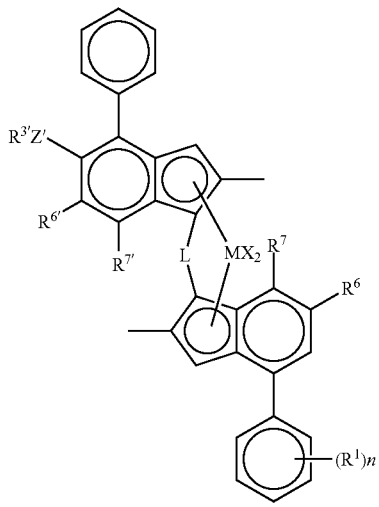

(III)

wherein
M is zirconium or hafnium;
each X is a sigma ligand, preferably each X is independently a hydrogen atom, a halogen atom, $C_{1-6}$ alkoxy group, $C_{1-6}$ alkyl, phenyl or benzyl group;
L is a divalent bridge selected from —R'$_2$C— or —R'$_2$Si— wherein each R' is independently a hydrogen atom, $C_{1-20}$ alkyl or $C_{3-10}$ cycloalkyl;
R[6] is hydrogen or a $C_{1-10}$ alkyl group;
R[6'] is a $C_{1-10}$ alkyl group or $C_{6-10}$ aryl group;

R[7] is hydrogen, $C_{1-6}$ alkyl or $OC_{1-6}$ alkyl;
Z' is O or S;
R[3'] is a $C_{1-10}$ alkyl group, or $C_{6-10}$ aryl group optionally substituted by one or more halo groups;
n is independently 0 to 4, e.g. 0, 1 or 2; and
each R[1] is independently a $C_{1-10}$ alkyl group.

Further preferred complexes of use in the invention are those of formula (IV) or (IV'):

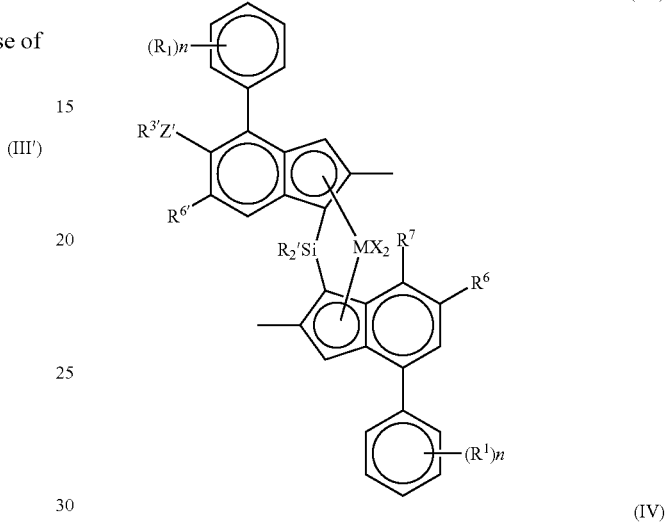

(IV')

(IV)

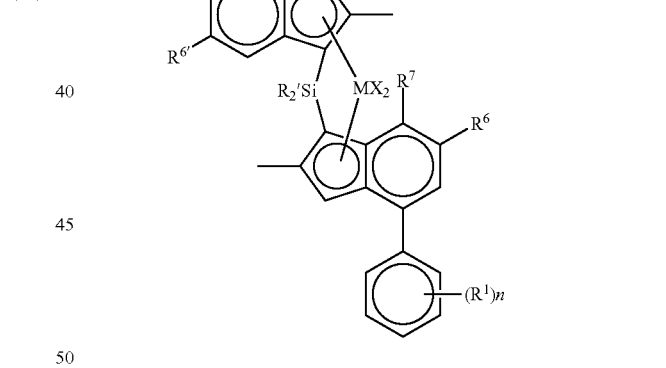

wherein
M is zirconium or hafnium;
each X is a sigma ligand, preferably each X is independently a hydrogen atom, a halogen atom, $C_{1-6}$-alkoxy group, $C_{1-6}$-alkyl, phenyl or benzyl group;
each R' is independently a hydrogen atom, $C_{1-20}$ alkyl or $C_{3-7}$ cycloalkyl;
R[6] is hydrogen or a $C_{1-10}$ alkyl group;
R[6'] is a $C_{1-10}$ alkyl group or $C_{6-10}$ aryl group;
R[7] is hydrogen, $C_{1-6}$ alkyl or $OC_{1-6}$ alkyl;
Z' is O or S;
R[3'] is a $C_{1-10}$ alkyl group, or $C_{6-10}$ aryl group optionally substituted by one or more halo groups;
n is independently 0, 1 to 2; and
each R[1] is independently a $C_{3-8}$ alkyl group.

Most especially, the complex of use in the invention is of formula (V) or (V'):

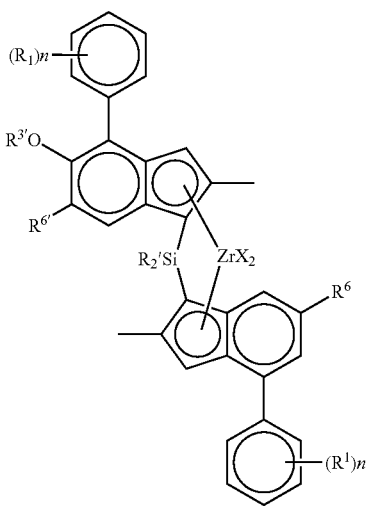

(V')

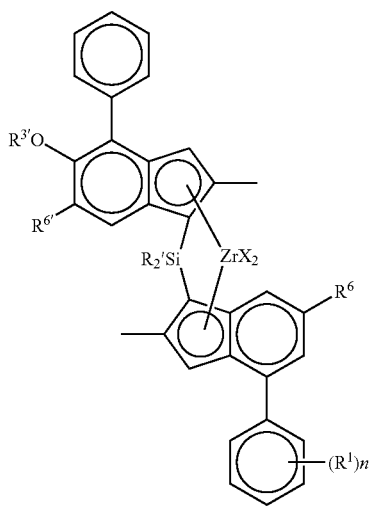

(V)

wherein
each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group;

$R^{3'}$ is a $C_{1-6}$ alkyl group, or $C_{6-10}$ aryl group optionally substituted by one or more halo groups; and n is independently 0, 1 or 2.

Particular compounds of the invention include: rac-anti-Me$_2$Si(2-Me-4-Ph-6-tBu-Ind)(2-Me-4-Ph-5-OMe-6-tBu-Ind)ZrCl$_2$ rac-anti-Me$_2$Si(2-Me-4-(p-tBuPh)-Ind)(2-Me-4-Ph-5-OMe-6-tBu-Ind)ZrCl$_2$ rac-anti-Me$_2$Si(2-Me-4-(3,5-di-tBuPh)-6-tBu-Ind)(2-Me-4-Ph-5-OMe-6-tBu-Ind)ZrCl$_2$ rac-anti-Me$_2$Si(2-Me-4-Ph-6-tBu-Ind)(2-Me-4,6-di-Ph-5-OMe-Ind)ZrCl$_2$ rac-anti-Me$_2$Si(2-Me-4-(p-tBuPh)-Ind)(2-Me-4-Ph-5-OC$_6$F$_5$)-6-iPr-Ind)ZrCl$_2$ rac-anti-Me(CyHex)Si(2-Me-4-Ph-6-tBu-Ind)(2-Me-4-Ph-5-OMe-6-tBu-Ind)ZrCl$_2$ rac-anti-Me$_2$Si(2-Me-4-(3,5-di-tBuPh)-7-Me-Ind)(2-Me-4-Ph-5-OMe-6-tBu-Ind)ZrCl$_2$ rac-anti-Me$_2$Si(2-Me-4-(3,5-di-tBuPh)-7-OMe-Ind)(2-Me-4-Ph-5-OMe-6-tBu-Ind)ZrCl$_2$ rac-anti-Me$_2$Si(2-Me-4-(p-tBuPh)-6-tBu-Ind)(2-Me-4-Ph-5-OMe-6-tBu-Ind)ZrCl$_2$ rac-anti-Me$_2$Si(2-Me-4-(p-tBuPh)-Ind)(2-Me-4-(4-tBuPh)-5-OMe-6-tBu-Ind)ZrCl$_2$ rac-anti-Me$_2$Si(2-Me-4-(p-tBuPh)-Ind)(2-Me-4-(3,5-tBu2Ph)-5-OMe-6-tBu-Ind)ZrCl$_2$ rac-anti-Me$_2$Si(2-Me-4-(p-tBuPh)-Ind)(2-Me-4-Ph-5-OiBu-6-tBu-Ind)ZrCl$_2$ For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

In one especially preferred embodiment the complex is rac-anti-Me$_2$Si(2-Me-4-(p-tBuPh)-Ind)(2-Me-4-Ph-5-OMe-6-tBu-Ind)ZrCl$_2$.

Concerning the synthesis of the complex according to this invention it is also referred to WO 2013/007650 A1.

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention.

Thus the catalyst according to this invention comprises (i) a complex as defined above and (ii) a cocatalyst, like an aluminium alkyl compound (or other appropriate cocatalyst), or the reaction product thereof. Thus the cocatalyst is preferably an alumoxane, like MAO or an alumoxane other than MAO.

Borate cocatalysts can also be employed. It will be appreciated by the skilled man that where boron based cocatalysts are employed, it is normal to preactivate the complex by reaction thereof with an aluminium alkyl compound, such as TIBA. This procedure is well known and any suitable aluminium alkyl, e.g. Al($C_{1-6}$-alkyl)$_3$, can be used.

Boron based cocatalysts of interest include those of formula $$BY_3$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are trifluoromethyl, p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris(3,4,5-trifluorophenyl)borane.

Particular preference is given to tris(pentafluorophenyl)borane.

It is preferred however is borates are used, i.e. compounds of general formula [C]+[BX4]−. Such ionic cocatalysts contain a non-coordinating anion [BX4]$^-$ such as tetrakis(pentafluorophenyl)borate. Suitable counterions [C]$^+$ are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: tributylammoniumtetrakis (pentafluorophenyl)borate, tributylammoniumtetrakis(trifluoromethylphenyl)borate, tributylammoniumtetrakis(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate. Preference is given to triphenylcarbeniumtetrakis(pentafluorophenyl)borate, N,N-dimethylcyclohexylammoniumtetrakis(pentafluorophenyl)borate or N,N-dimethylbenzylammoniumtetrakis(pentafluorophenyl)borate.

The use of $B(C_6F_5)_3$, $C_6H_5N(CH_3)_2H:B(C_6F_5)_4$, $(C_6H_5)_3C:B(C_6F_5)_4$ is especially preferred.

The metallocene complex of the present invention can be used in combination with a suitable cocatalyst as a catalyst e.g. in a solvent such as toluene or an aliphatic hydrocarbon, (i.e. for polymerization in solution), as it is well known in the art. Preferably, polymerization takes place in the condensed phase or in gas phase.

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856, WO95/12622 and WO2006/097497. The particle size is not critical but is preferably in the range 5 to 200 μm, more preferably 20 to 80 μm. The use of these supports is routine in the art.

In preferred embodiment, no support is used at all. Such a catalyst can be prepared in solution, for example in an aromatic solvent like toluene, by contacting the metallocene (as a solid or as a solution) with the cocatalyst, for example methylaluminoxane or a borane or a borate salt, or can be prepared by sequentially adding the catalyst components to the polymerization medium. In a preferred embodiment, the metallocene (when X differs from alkyl or hydrogen) is prereacted with an aluminum alkyl, in a ratio metal/aluminum of from 1:1 up to 1:500, preferably from 1:1 up to 1:250, and then combined with the borane or borate cocatalyst, either in a separate vessel or directly into the polymerization reactor. Preferred metal/boron ratios are between 1:1 and 1:100, more preferably 1:1 to 1:10.

In one particularly preferred embodiment, no external carrier is used but the catalyst is still presented in solid particulate form. Thus no external support material such as inert organic or inorganic carrier, such as for example silica as described above is employed.

In order to provide the catalyst of the invention in solid form but without using an external carrier, it is preferred if a liquid/liquid emulsion system is used. The process involves forming dispersing catalyst components (i) and (ii), i.e. the complex and the cocatalyst, in a solvent, and solidifying said dispersed droplets to form solid particles.

Reference is made to WO2006/069733 describing principles of such a continuous or semicontinuous preparation methods of the solid catalyst types, prepared via emulsion/solidification method. For further details it is also referred to WO 2013/007650 A1.

According to a further aspect, the present invention relates to the use of the polypropylene composition as described above for preparing a molded article, such as an injection-molded article or an extrusion-molded article.

The present invention will now be described in further detail by the following Examples.

EXAMPLES

1. Measuring Methods

The following definitions of terms and determination methods apply for the above general description of the invention as well as to the below examples unless otherwise defined. Calculation of comonomer content of the propylene copolymer fraction (CF2):

$$\frac{C(P1+P2) - w(P1) \times C(P1)}{w(P2)} = C(P2)$$

wherein w(P1) is the weight fraction [in wt.-%] of the propylene copolymer fraction (CF1) based on the weight of the propylene copolymer (C), w(P2) is the weight fraction [in wt.-%] of propylene copolymer fraction (CF2) based on the weight of the propylene copolymer (C), C(P1) is the comonomer content [in mol-%] of the propylene copolymer fraction (CF1), C(P1+P2) is the comonomer content [in mol-%] of the propylene copolymer (C), C(P2) is the calculated comonomer content [in mol-%] of the propylene copolymer fraction (CF2).

Calculation of melt flow rate $MFR_2$ (230° C.) of the propylene copolymer fraction (CF2):

$$MFR(P2) = 10^{\left[\frac{\log(MFR(P1+P2)) - w(P1) \times \log(MFR(P1))}{w(P2)}\right]}$$

wherein w(P1) is the weight fraction [in wt.-%] of the propylene copolymer fraction (CF1) based on the weight of the propylene copolymer (C), w(P2) is the weight fraction [in wt.-%] of the propylene copolymer fraction (CF2) based on the weight of the propylene copolymer (C), MFR(P1) is the melt flow rate $MFR_2$ (230° C.) [in g/10 min] of the propylene copolymer fraction (CF1), MFR(P1+P2) is the melt flow rate $MFR_2$ (230° C.) [in g/10 min] of the propylene copolymer (C), MFR(P2) is the calculated melt flow rate $MFR_2$ (230° C.) [in g/10 min] of the propylene copolymer fraction (CF2).

Identical approach is used in case the propylene copolymer (C) consists of a propylene homopolymer fraction (HF1) (wherein (CF1) is replaced by (HF1)) and a propylene copolymer fraction (CF1') (wherein (CF2) is replaced by (CF1')).

Calculation of comonomer content of the elastomeric copolymer (E), e.g. of the terpolymer (T):

$$\frac{C(P1+P2) - w(P1) \times C(P1)}{w(P2)} = C(P2)$$

wherein w(P1) is the weight fraction [in wt.-%] of the propylene copolymer (C) based on the weight of the polypropylene composition, w(P2) is the weight fraction [in wt.-%] of the elastomeric copolymer (E) based on the weight of the polypropylene composition, C(P1) is the comonomer content [in mol-%] of the propylene copolymer (C), C(P1+P2) is the comonomer content [in mol-%] of the polypropylene composition, C(P2) is the calculated comonomer content [in mol-%] of the elastomeric copolymer (E).

Quantification of Polymer Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 2009, 50, 2373}. Standard single-pulse excitation was employed utilising the NOE at short recycle delays {Pollard, M., Klimke, K., Graf, R., Spiess, H. W., Wilhelm, M., Sperber, O., Piel, C., Kaminsky, W., Macromolecules 2004, 37, 813; Klimke, K., Parkinson, M., Piel, C., Kaminsky, W., Spiess, H. W., Wilhelm, M., Macromol. Chem. Phys. 2006, 207, 382} and the RS-HEPT decoupling scheme {Filip, X., Tripon, C., Filip, C., J. Mag. Resn. 2005, 176, 239; Griffin, J. M., Tripon, C., Samoson, A., Filip, C., and Brown, S. P., Mag. Res. in Chem. 2007 45, S1, S198}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

The tacticity distribution was quantified through integration of the methyl region in the $^{13}C\{^1H\}$ spectra correcting for any sites not related to the stereo sequences of interest. {Busico, V., Cipullo, R., Prog. Polym. Sci. 2001, 26, 443; Busico, V., Cipullo, R., Monaco, G., Vacatello, M., Segre, A. L., Macromoleucles 1997, 30, 6251}.

The influence of regio defects on the quantification of the tacticity distribution was corrected for by subtraction of representative regio defect integrals from specific integrals of the stereo sequences.

The influence of comonomer on the quantification of the tacticity distribution was corrected for by subtraction of representative comonomer integrals from specific integrals of the stereo sequences.

The isotacticity was determined at the triad level and reported as the percentage of isotactic triad (mm) with respect to all triad sequences:

mm[%]=100*(mm/sum of all triads)

where mr represents the sum of the reversible mr and rm triad sequences.

Characteristic signals indicative of regio defects were observed {Resconi, L., Cavallo, L., Fait, A., Piemontesi, F., Chem. Rev. 2000, 100, 1253}.

The presence of 2,1-erythro regio defects was indicated by the presence of the Pαβ and Pαγ methyl sites at 17.7 and 17.2 ppm and confirmed by other characteristic signals.

The amount of 2,1-erythro regio defects was quantified using the average integral of the Pαβ and Pαγ sites at 17.7 and 17.2 ppm:

$P_{21e}=0.5*(I_{e6}+I_{e8})$

The presence of ethylene incorporated directly after a secondary inserted propene (E21) was indicated by the presence of the Sαβδ, Sαβγ and Tγγ sites at 34.9, 34.5 and 33.8 ppm and confirmed by other characteristic signals.

The amount ethylene incorporated directly after a secondary inserted propene was quantified using the integral of the Tγγ site at 33.8 ppm:

$E21=ITT\gamma\gamma$

The total amount of secondary (2,1) inserted propene was quantified as the sum of all units containing secondary inserted propene:

$P_{21}=P_{21e}+E21$

Characteristic signals corresponding to other regio defects were not observed {Resconi, L., Cavallo, L., Fait, A., Piemontesi, F., Chem. Rev. 2000, 100, 1253}.

The total amount of primary (1,2) inserted propene was quantified based on the propene methyl sites between 23.6 and 19.7 ppm with correction for any included sites not related to primary insertion:

$P_{12}=I_{CH3}+P_{21e}$

The total amount of propene was quantified as the sum of primary (1,2) inserted propene and all regio defects:

$P_{total}=P_{12}+P_{21}$

The mole percent of 2,1-erythro regio defects was quantified with respect to all propene:

[21e]mol %=100*($P_{21e}/P_{total}$)

Characteristic signals corresponding to the incorporation of 1-hexene were observed and the comonomer fraction calculated as the fraction of 1-hexene in the polymer with respect to all monomer in the polymer:

fHtotal=Htotal/(Etotal+Ptotal+Htotal))

The amount isolated 1-hexene incorporated in PPHPP sequences was quantified using the integral of the αB4 sites at 44.1 ppm accounting for the number of reporting sites per comonomer and the presence of consecutively incorporated 1-hexene in PPHHPP sequences:

H=(IαB4/2)−(HH/2)

The amount consecutively incorporated 1-hexene in PPHHPP sequences was quantified using the integral of the ααB4B4 site at 41.6 ppm accounting for the number of reporting sites per comonomer:

HH=2*IααB4B4

The total 1-hexene content was calculated based on the sum of isolated and consecutively incorporated 1-hexene:

$H$total=$H$+$HH$

Characteristic signals corresponding to the incorporation of ethylene were observed and the comonomer fraction calculated as the fraction of ethylene in the polymer with respect to all monomer in the polymer:

$fE$total=$E$total/($E$total+$P$total+$H$total)

The amount isolated and non-consecutive ethylene incorporated in PPEPP and PPEPEPP sequences respectively was quantified using the integral of the Sββ sites at 24.5 ppm accounting for the number of reporting sites per comonomer:

$E=I_{S\beta\beta}$

The presence of non-consecutive ethylene incorporation in PPEPEPP sequences was indicated by the presence of the Tδδ site at 33.1 ppm and confirmed by other characteristic signals.

The amount double consecutively incorporated ethylene in PPEEPP sequences was quantified using the integral of the Sβδ site at 27.1 ppm accounting for the number of reporting sites per comonomer:

$EE=I_{S\beta\delta}$

The amount triple or longer consecutively incorporated ethylene in PP(E)nPP sequences was quantified using the integral of the Sδδ and Sγδ sites at 29.6 and 30.1 ppm accounting for the number of reporting sites per comonomer:

$EEE=(IS\delta\delta/2)+(IS\gamma\delta/4)$

The total ethylene content was calculated based on the sum of isolated, consecutively incorporated ethylene and ethylene incorporated directly after a secondary inserted propene:

$E$total=$E$+$EE$+$EEE$+$E21$

The mole percent comonomer incorporation is calculated from the mole fraction:

$H$[mol %]=100*$fH$total $E$[mol %]=100*$fE$total

The weight percent comonomer incorporation is calculated from the mole fraction:

$H$[wt %]=100*($fH$total*84.16)/(($fE$total*28.05)+($fH$total*84.16)+((1−($fE$total+$fH$total))*42.08))

$E$[wt %]=100*($fE$total*28.05)/(($fE$total*28.05)+($fH$total*84.16)+((1−($fE$total+$fH$total))*42.08))

MFR$_2$ (230° C.) is measured according to ISO 1133-1 (230° C., 2.16 kg load).

The xylene solubles (XCS, wt.-%): Content of xylene cold solubles (XCS) is determined at 25° C. according ISO 16152; first edition; 2005-07-01.

Intrinsic viscosity is measured according to DIN ISO 1628/1, October 1999 (in Decalin at 135° C.).

DSC analysis, melting temperature ($T_m$) and heat of fusion ($H_f$), crystallization temperature ($T_c$) and heat of crystallization ($H_c$) measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Tensile Modulus was measured according to ISO 527-2 (cross head speed=1 mm/min; 23° C.) using injection molded specimens as described in EN ISO 1873-2 (dog bone shape, 4 mm thickness).

The Charpy notched impact strength (Charpy NIS) was measured according to ISO 179 1 eA at −20° C., using injection molded bar test specimens of 80×10×4 mm$^3$ mm$^3$ prepared in accordance with ISO 294-1:1996

Brittle-to-Ductile Transition Temperature

The determination of the brittle-to-ductile transition temperature (BDTT) is based on the a(cN) values as determined from Charpy instrumented impact strength according to ISO 179-2:2000 on V-notched specimen with a geometry of 80×10×4 mm3 as required in ISO 179-1 eA.

The a(cN) values are determined in intervals of 3° C. from −40° C. to +41° C. with an impact velocity of 1.5 m/s and plotted over temperature, calculating the BDTT as the average value of the step increase. For a detailed description of the determination of the BDTT reference is made to Grein, C. et al, Impact Modified Isotactic Polypropylene with Controlled Rubber Intrinsic Viscosities: Some New Aspects About Morphology and Fracture, J Appl Polymer Sci, 87 (2003), 1702-1712.

2. Examples

The catalyst has been prepared following the procedure described in WO 2013/007650 A1 for catalyst E2, by adjusting the metallocene and MAO amounts in order to achieve the Al/Zr ratio indicated in table 1. The catalyst has been off-line prepolymerized with propylene, following the procedure described in the above document for catalyst E2P.

TABLE 1

| | Catalyst | | | |
|---|---|---|---|---|
| cat. | Metallocene | DofP[1] [g/g] | Al/Zr[2] [mol/mol] | MC[3] [wt.-%] |
| Cat | MC1* | 1.8 | 267 | 1.69 |

*rac-anti-Me$_2$Si(2-Me-4-(p-tBuPh)-Ind)(2-Me-4-Ph-5-OMe-6-tBu-Ind)ZrCl$_2$
[1]Degree of off-line pre-polymerisation
[2]Al/Zr molar ratio in catalyst
[3]MC content of off-line prepolymerised catalyst Comparative Example CE1

Step 1: Prepolymerization+Bulk

A stirred autoclave (double helix stirrer) with a volume of 21.2 dm$^3$ containing 0.2 bar-g propylene is filled with additional 3.97 kg propylene. After adding 0.73 mmol triethylaluminium (Aldrich, 1 molar solution in n-hexane) using a stream of 250 g propylene, the solution is stirred at 20° C. and 250 rpm for 20 min, then the reactor is brought up to the set prepolymerization temperature (HB-Therm) and the catalyst is injected as described in the following. The solid, pre-polymerized catalyst (amount as listed in Table 2) is loaded into a 5-mL stainless steel vial inside the glovebox, the vial is attached to the autoclave, then a second 5-mL vial containing 4 ml n-hexane and pressurized with 10 bars of N2 is added on top, the valve between the two vials is opened and the solid catalyst is contacted with hexane under N2 pressure for 2 s, then flushed into the reactor with 250 g propylene. Stirring speed is increased to 250 rpm and prepolymerisation is run for the set time. At the end of the prepolymerization step the stirring speed is increased to 250 rpm and the reactor temperature raised to 80° C. When the internal reactor temperature reaches 71° C., the desired H2 amount is added with a defined flow via thermal mass flow controller. The reactor temperature is held constant throughout the polymerization time. The polymerization time is measured starting when the temperature is 2° C. below the set polymerization temperature.

Step 2: Gas Phase

After the bulk step is finished, the stirrer speed is reduced to 50 rpm and the reactor pressure reduced to 24.5 bar-g by venting. Afterwards the stirrer speed is set to 180 rpm, the reactor temperature to 85° C. and the chosen amount of 1-hexene is dosed via mass flow controllers (MFC) with a flow of 15 g/min. Then the reactor P and T are held constant by feeding via MFC a given ratio of C3/C6 at 25 bar-g and 85° C. for the time needed to reach the target split. Then the reaction is stopped by setting the stirrer speed to 20 rpm, cooling the reactor down to 30° C., flashing the volatile components.

After flushing the reactor twice with N2 and one vacuum/N2 cycle, the product is taken out and dried overnight in a hood. 100 g of the polymer is additivated with 0.2 wt % Ionol and 0.1 wt % PEPQ (dissolved in acetone) and dried also overnight in a hood+2 hours in a vacuum drying oven at 60° C.

Comparative Examples CE2, CE3 and Inventive Examples IE1, IE2, IE3, IE4

Step 1: Prepoly+Bulk See CE1

Step 2: Gas Phase 1

After the bulk step is finished, the stirrer speed is reduced to 50 rpm and the reactor pressure reduced to 24.5 bar-g by venting. Afterwards the stirrer speed is set to 180 rpm, the reactor temperature to 85° C. and the chosen amount of 1-hexene is dosed via MFC with a flow of 15 g/min. Then the reactor P and T are held constant by feeding via MFC a given ratio of C3/C6 at 25 bar-g and 85° C. for the time required to reach the target split.

Step 3: Gas Phase 2

After the bulk+gas step 1 has finished, the temperature control device was set to 70° C. and the stirrer speed is reduced to 50 rpm. The reactor pressure is then reduced to 0.3 bar-g by venting, the stirrer speed is adjusted to 180 rpm and the reactor T to the target value. Then the reactor filling is started by feeding a defined ratio of C3/C2 monomer gas. This ratio depends on the relative comonomer reactivity ratio (R C2/C3) of the given catalyst system and the desired copolymer composition. The speed of the reactor filling during the transition is limited by the max. flow of the gas flow controllers. When the reactor temperature reaches 1° below the target temperature and the pressure has reached the desired value, the composition of the dosed C3/C2 mixture is changed to match the desired polymer composition and both temperature and pressure are held constant as long as the amount of C3/C2 gas mixture required to reach the target split of rubber to matrix has been consumed. The reaction is stopped by setting the stirrer speed to 20 rpm, cooling the reactor to 30° C. and flashing the volatile components.

After flushing the reactor twice with N2 and one vacuum/N2 cycle, the product is taken out and dried overnight in a hood. 100 g of the polymer is additivated with 0.2 wt % Ionol and 0.1 wt % PEPQ (dissolved in acetone) and dried also overnight in a hood+2 hours in a vacuum drying oven at 60° C.

Specific polymerisation process parameters for the comparative and inventive examples are shown in table 2a and 2b.

TABLE 2a

Polymerization and Properties of the comparative examples

| Parameter | unit | CE1 | CE2 | CE3 |
|---|---|---|---|---|
| Prepolymerisation | | | | |
| temperature | [° C.] | 20 | 20 | 20 |
| residence time | [min] | 10 | 10 | 10 |
| prepolymerized cat. amount | [mg] | 138 | 138 | 138 |
| Loop | | | | |
| temperature | [° C.] | 80 | 80 | 80 |
| pressure | [bar-g] | 55 | 55 | 55 |
| residence time | [min] | 30 | 30 | 30 |
| C3 total | [g] | 4429 | 4423 | 4429 |
| H2 total | [nl] | 2.8 | 2.8 | 1.8 |
| yield | [g] | 515 | 565 | 597 |
| C2 | [mol-%] | 0 | 0 | 0 |
| C6 | [mol-%] | 0 | 0 | 0 |
| Split | [wt.-%] | 52 | 32 | 34 |
| GPR1 | | | | |
| temperature | [° C.] | 85 | 85 | 85 |
| pressure | [bar-g] | 25 | 25 | 25 |
| residence time | [min] | 62 | 51 | 60 |
| H2 feed | [nl] | 0 | 0 | 0 |
| C3 feed during transition | [g] | 1050 | 1050 | 1050 |
| C3 feed during polymerization | [g] | 430 | 430 | 430 |
| C6 feed during transition | [g] | 49 | 50 | 50 |
| C6 feed during polymerization | [g] | 38 | 40 | 38 |
| yield | [g] | 468 | 470 | 468 |
| C2 total | [mol-%] | 0 | 0 | 0 |
| C6 total | [mol-%] | 2.3 | 1.1 | 1.2 |
| C6* | [mol-%] | 4.6 | 3.7 | 4.4 |
| XCS | [wt.-%] | 26.6 | 27.1 | 28 |
| MFR | [g/10 min] | 28.5 | | |
| IV | [dl/g] | 1.5 | | |
| Split | [wt.-%] | 48 | 27 | 26 |
| GPR2 | | | | |
| temperature | [° C.] | | 70 | 70 |
| pressure | [bar-g] | | 19.6 | 19.7 |
| residence time | [min] | | 63 | 46 |
| H2 feed | [nl] | | 0 | 0 |
| C3 feed during transition | [g] | | 483 | 483 |
| C3 feed during polymerization | [g] | | 648 | 640 |
| C2 feed during transition | [g] | | 155 | 155 |
| C2 feed during polymerization | [g] | | 71 | 70 |
| yield | [g] | | 719 | 710 |
| C2 | [mol-%] | | 8 | 8 |
| C6 | [mol-%] | | 1.1 | 1.2 |
| C2' | [mol-%] | | 19.5 | 20.0 |
| C6** | [mol-%] | | 0.24 | 0.15 |
| XCS | [wt.-%] | | 57.0 | 56.8 |
| C2 in XCS | [mol-%] | | 13.3 | 13.9 |

TABLE 2a-continued

Polymerization and Properties of the comparative examples

| Parameter | unit | CE1 | CE2 | CE3 |
|---|---|---|---|---|
| C6 in XCS | [mol-%] | 5.9 | 1.2 | 0.7 |
| MFR | [g/10 min] |  | 7.7 | 5.5 |
| IV | [dl/g] |  | 1.85 | 2.04 |
| IV of XCS | [dl/g] |  | 2.3 | 2.2 |
| Split | [wt.-%] |  | 41 | 40 |

TABLE 2b

Polymerization and Properties of the inventive examples

| Parameter | unit | IE1 | IE2 | IE3 | IE4 |
|---|---|---|---|---|---|
| Prepolymerisation | | | | | |
| temperature | [° C.] | 20 | 20 | 20 | 20 |
| residence time | [min] | 10 | 10 | 10 | 10 |
| prepolymerized cat. amount | [mg] | 142 | 182 | 139 | 140 |
| Loop | | | | | |
| temperature | [° C.] | 80 | 80 | 80 | 80 |
| pressure | [bar-g] | 55 | 55 | 55 | 55 |
| residence time | [min] | 30 | 30 | 30 | 36.5 |
| C3 total | [g] | 4425 | 4436 | 4429 | 4429 |
| H2 total | [nl] | 2.8 | 2.8 | 1.8 | 1.8 |
| yield | [g] | 531 | 772 | 598 | 792 |
| C2 | [mol-%] | 0 | 0 | 0 | 0 |
| C6 | [mol-%] | 0 | 0 | 0 | 0 |
| Split | [wt.-%] | 31 | 37 | 38 | 39 |
| GPR1 | | | | | |
| temperature | [° C.] | 85 | 85 | 85 | 85 |
| pressure | [bar-g] | 25 | 25 | 25 | 25 |
| residence time | [min] | 62 | 51 | 60 | 69 |
| H2 feed | [nl] | 0 | 0 | 0 | 0 |
| C3 feed during transition | [g] | 1050 | 1000 | 1050 | 1050 |
| C3 feed during polymerization | [g] | 440 | 500 | 224 | 336 |
| C6 feed during transition | [g] | 50 | 50 | 50 | 48 |
| C6 feed during polymerization | [g] | 36 | 45 | 21 | 29 |
| yield | [g] | 476 | 545 | 245 | 365 |
| C2 total | [mol-%] | 0 | 0 | 0 | 0 |
| C6 total | [mol-%] | 1.7 | 1.6 | 1.3 | 0.9 |
| C6* | [mol-%] | 3.5 | 3.9 | 4.3 | 2.8 |
| XCS | [wt.-%] | 32.7 | 23.8 | 15.6 | 16.0 |
| Split | [wt.-%] | 28 | 26 | 16 | 18 |
| GPR2 | | | | | |
| temperature | [° C.] | 70 | 70 | 70 | 70 |
| pressure | [bar-g] | 20 | 19.8 | 20 | 20 |
| residence time | [min] | 55 | 68 | 131 | 123 |
| H2 feed | [nl] | 0 | 0 | 0 | 0 |
| C3 feed during transition | [g] | 321 | 227 | 328 | 252 |
| C3 feed during polymerization | [g] | 568 | 549 | 569 | 625 |
| C2 feed during transition | [g] | 238 | 285 | 244 | 271 |
| C2 feed during polymerization | [g] | 139 | 234 | 142 | 268 |
| yield | [g] | 707 | 783 | 711 | 893 |
| C2 total | [mol-%] | 15.7 | 19.0 | 15.0 | 19.7 |
| C6 total | [mol-%] | 1.1 | 1.1 | 0.8 | 0.6 |
| C2' | [mol-%] | 38.3 | 51.4 | 32.6 | 45.8 |
| C6** | [mol-%] | 0.24 | 0.25 | 0.21 | 0.20 |
| XCS | [wt.-%] | 60.3 | 52.0 | 54.4 | 52.1 |
| C2 in XCS | [mol-%] | 25.7 | 36.3 | 26.6 | 36.1 |
| C6 in XCS | [mol-%] | 0.9 | 0.9 | 0.8 | 0.5 |
| MFR | [g/10 min] | 15.5 | 15.6 | 4.9 | 6.1 |
| IV | [dl/g] | 1.61 | 1.72 | 1.94 | 1.85 |

TABLE 2b-continued

Polymerization and Properties of the inventive examples

| Parameter | unit | IE1 | IE2 | IE3 | IE4 |
|---|---|---|---|---|---|
| IV of XCS | [dl/g] | 1.7 | 1.8 | 2.0 | 1.6 |
| Split | [wt.-%] | 41 | 37 | 46 | 43 |

'is the C2 content of the polymer produced in the GPR2
*is the C6 content of the polymer produced in the GPR1
**is the C6 content of the polymer produced in the GPR2

TABLE 3

Properties of the examples

| Parameter | unit | CE1 | CE2 | CE3 | IE1 | IE2 | IE3 | IE4 |
|---|---|---|---|---|---|---|---|---|
| Tg [° C.] | [° C.] | — | −16 | −16.6 | −35.2 | −44.1 | −34.9 | −41.9 |
| NIS (−19° C.) | [kJ/m$^2$] | 1.1 | 1.5 | 1.6 | 80 | 51 | 80 | 81 |
| DBTT | [° C.] | 51 | 2 | 4 | −26 | −31 | −29 | −35 |
| $T_m$ | [° C.] | 147 | 142 | 147 | 142 | 143 | 145 | 144 |
| $T_c$ | [° C.] | 104 | 107 | 104 | 106 | 106 | 107 | 109 |
| TM | [MPa] | 767 | 363 | 327 | 264 | 402 | 292 | 375 |

$T_g$ glass transition temperature of the amorphous phase
NIS (−19° C.) Notched Impact Strength at −19° C.
DBTT Ductile to brittle transition temperature
$T_m$ melting temperature
$T_c$ crystallization temperature
TM Tensile Modulus

The invention claimed is:

1. A polypropylene composition comprising comonomer units derived from ethylene in an amount of from 9.0 to 52.0 mol-% and comonomer units derived from at least one $C_{5-12}$ α-olefin in an amount of from 0.4 to 3.0 mol-%, wherein the polypropylene composition
    (a) has an amount of xylene cold solubles (XCS) of at least 30 wt.-%,
    (b) fulfills in-equation (I)

$$IV(XCS) - IV(tot) \leq 0.30 \qquad (I)$$

wherein IV(XCS) is the intrinsic viscosity (IV) of the xylene cold soluble (XCS) fraction of the polypropylene composition, and IV(tot) is the intrinsic viscosity (IV) of the polypropylene composition, and
    (c) is a heterophasic propylene copolymer (HECO) comprising a propylene copolymer (C) and an elastomeric copolymer (E), wherein the propylene copolymer (C) is a propylene copolymer of units derived from propylene and at least one $C_{5-12}$ α-olefin and the elastomeric copolymer (E) is a terpolymer (T) of units derived from propylene ethylene and $C_{5-12}$ α-olefin.

2. The polypropylene composition according to claim 1, wherein the xylene cold soluble (XCS) fraction has an amount (a) of ethylene-derived comonomer units of from 20.0 to 80.0 mol-%; and/or (b) of $C_{5-12}$ α-olefin-derived comonomer units of from 0.1 to 1.5 mol-%.

3. A polypropylene composition comprising comonomer units derived from ethylene in an amount of from 9.0 to 52.0 mol-% and comonomer units derived from at least one $C_{5-12}$ α-olefin in an amount of from 0.4 to 3.0 mol-%, wherein the polypropylene composition has an amount of xylene cold solubles (XCS) of at least 30 wt.-%,
    wherein further the xylene cold solubles (XCS) of the polypropylene composition has an amount of (a) of ethylene-derived comonomer units of from 20.0 to 80.0 mol-%; and/or (b) of $C_{5-12}$ α-olefin-derived comonomer units of from 0.1 to 1.5 mol-%.

4. The polypropylene composition according to claim 3, wherein the polypropylene composition fulfills in-equation (I)

$$IV(XCS)-IV(tot) \leq 0.30 \qquad (I)$$

wherein
IV(XCS) is the intrinsic viscosity (IV) of the xylene cold soluble (XCS) fraction of the polypropylene composition and IV(tot) is the intrinsic viscosity (IV) of the polypropylene composition.

5. The polypropylene composition according to claim 1, wherein
(a) the amount of 20 wt-% of ethylene-derived comonomer units in the xylene cold soluble (XCS) fraction of the polypropylene composition is excluded; and/or
(b) the polypropylene composition fulfills in-equation (II)

$$57.0 < \frac{XCS}{CX(XCS)} < 300 \qquad (II)$$

wherein
CX(XCS) is the amount in mol-% of $C_{5\text{-}12}$ α-olefin-derived comonomer units in the xylene cold soluble (XCS) fraction of the polypropylene composition,
XCS is the amount in wt.-% of xylene cold soluble (XCS) fraction of the polypropylene composition.

6. The polypropylene composition according to claim 1, wherein
(a) the $C_{5\text{-}12}$ α-olefin is 1-hexene or 1-octene; and/or
(b) the total amount of comonomer units in the polypropylene composition is from 9.4 to 55.5 mol-%.

7. The polypropylene composition according to claim 1, wherein
(a) the intrinsic viscosity (IV) of the xylene cold soluble (XCS) fraction of the polypropylene composition is in the range of 1.5 to 4.0 dl/g; and/or
(b) the intrinsic viscosity (IV) of the polypropylene composition is in the range of 1.0 to 3.0 dl/g.

8. The polypropylene composition according to claim 1, wherein the polypropylene composition has a glass transition temperature below −25° C.

9. The polypropylene composition according to claim 1, wherein the propylene copolymer (C) comprises a propylene homopolymer fraction (HF1) and a propylene copolymer fraction (CF1'), wherein further the propylene copolymer fraction (CF1') consists of units derived from derived from propylene and at least one $C_{5\text{-}12}$ α-olefin.

10. The polypropylene composition according to claim 1, wherein
(a) the terpolymer (T) has a comonomer content in the range of 20.05 to 82.0 mol-%; and/or
(b) the weight ratio between the propylene homopolymer fraction (HF1) and the propylene copolymer fraction (CF1') [(HF1)/(CF1')] is 75/25 to 30/70; and/or
(c) the weight ratio between the propylene copolymer (C) and the elastomeric copolymer (E) [(C)/(E)] is 75/25 to 40/60.

11. A molded article comprising the polypropylene composition according to claim 1.

12. A process for preparing the polypropylene composition according to claim 1, comprising
(i) preparing the propylene homopolymer fraction (HF1) in a first polymerization reactor PR1,
(ii) transferring the propylene homopolymer fraction (HF1) obtained in the polymerization reactor (R1) to a polymerization reactor (R2) and preparing the propylene copolymer fraction (CF1') by polymerizing propylene and at least one $C_{5\text{-}12}$ α-olefin in the presence of propylene homopolymer fraction (HF1), thereby obtaining the propylene copolymer (C); and
(iii) transferring the propylene copolymer (C) of step (ii) into a polymerization reactor (R3) and preparing the elastomeric copolymer (E) by polymerizing propylene, ethylene and at least one $C_{5\text{-}12}$ α-olefin in the presence of the propylene copolymer (C), thereby obtaining the polypropylene composition.

13. The polypropylene composition according to claim 6, wherein
(a) the $C_{5\text{-}12}$ α-olefin is 1-hexene; and/or
(b) the total amount of comonomer units are derived from ethylene and at least one $C_{5\text{-}12}$ α-olefin in the polypropylene composition is from 9.4 to 55.5 mol-%.

14. The polypropylene composition according to claim 3, wherein
(a) the amount of 20 wt-% of ethylene-derived comonomer units in the xylene cold soluble (XCS) fraction of the polypropylene composition is excluded; and/or
(b) the polypropylene composition fulfills in-equation (II)

$$57.0 < \frac{XCS}{CX(XCS)} < 300 \qquad (II)$$

wherein
CX(XCS) is the amount in mol-% of $C_{5\text{-}12}$ α-olefin-derived comonomer units in the xylene cold soluble (XCS) fraction of the polypropylene composition,
XCS is the amount in wt.-% of xylene cold soluble (XCS) fraction of the polypropylene composition.

15. The polypropylene composition according to claim 3, wherein
(a) the $C_{5\text{-}12}$ α-olefin is 1-hexene or 1-octene; and/or
(b) the total amount of comonomer units in the polypropylene composition is from 9.4 to 55.5 mol-%.

16. The polypropylene composition according to claim 3, wherein
(a) the intrinsic viscosity (IV) of the xylene cold soluble (XCS) fraction of the polypropylene composition is in the range of 1.5 to 4.0 dl/g; and/or
(b) the intrinsic viscosity (IV) of the polypropylene composition is in the range of 1.0 to 3.0 dl/g.

17. The polypropylene composition according to claim 3, wherein the polypropylene composition has a glass transition temperature below −25° C.

18. The polypropylene composition according to claim 3, wherein the polypropylene composition is a heterophasic propylene copolymer (HECO) comprising a propylene copolymer (C) and an elastomeric copolymer (E), wherein the propylene copolymer (C) is a propylene copolymer of units derived from propylene and at least one $C_{5\text{-}12}$ α-olefin and the elastomeric copolymer (E) is a terpolymer (T) of units derived from propylene, ethylene and $C_{5\text{-}12}$ α-olefin.

19. The polypropylene composition according to claim 18, wherein the propylene copolymer (C) comprises a propylene homopolymer fraction (HF1) and a propylene copolymer fraction (CF1'), wherein further the propylene copolymer fraction (CF1') consists of units derived from derived from propylene and at least one $C_{5\text{-}12}$ α-olefin.

* * * * *